(12) United States Patent
Matsuoka et al.

(10) Patent No.: US 11,009,891 B2
(45) Date of Patent: May 18, 2021

(54) VEHICLE AND CONTROL METHOD THEREOF

(71) Applicant: Toyota Jidosha Kabushiki Kaisha, Toyota (JP)

(72) Inventors: Tomohito Matsuoka, Nagoya (JP); Seiichi Tsunoda, Nisshin (JP); Jiro Goto, Seto (JP); Masayuki Yamada, Tokyo (JP); Yasutaka Eto, Okazaki (JP); Keima Fukunaga, Toyota (JP); Kinya Tagawa, Tokyo (JP); Yasuhiro Sasaki, Tokyo (JP); Sho Tanaka, Tokyo (JP); Yuki Shinohara, Tokyo (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 27 days.

(21) Appl. No.: 16/227,240

(22) Filed: Dec. 20, 2018

(65) Prior Publication Data
US 2019/0196504 A1 Jun. 27, 2019

(30) Foreign Application Priority Data
Dec. 26, 2017 (JP) .............................. JP2017-250206

(51) Int. Cl.
| G05D 1/02 | (2020.01) |
| G05D 1/00 | (2006.01) |
| B60P 1/00 | (2006.01) |
| G06Q 50/30 | (2012.01) |

(52) U.S. Cl.
CPC .............. *G05D 1/0291* (2013.01); *B60P 1/00* (2013.01); *G05D 1/0088* (2013.01); *G05D 1/0231* (2013.01); *G05D 1/0295* (2013.01); *G05D 2201/0212* (2013.01); *G06Q 50/30* (2013.01)

(58) Field of Classification Search
CPC .. G05D 1/0291; G05D 1/0088; G05D 1/0231; G05D 1/0295; G05D 2201/0212; G06Q 50/30; B60P 1/00
See application file for complete search history.

(56) References Cited

U.S. PATENT DOCUMENTS

| 8,674,845 B2* | 3/2014 | Carter | B60T 7/16 340/426.11 |
| 9,135,482 B2* | 9/2015 | Caputo | G16B 50/00 |
| 9,552,564 B1* | 1/2017 | Martenis | G07C 5/008 |
| 9,720,414 B1* | 8/2017 | Theobald | G06Q 50/14 |
| 10,379,537 B1* | 8/2019 | Arden | G06Q 50/30 |

(Continued)

FOREIGN PATENT DOCUMENTS

| JP | 2006-069729 A | 3/2006 |
| JP | 2015-074305 A | 4/2015 |
| JP | 2017-036003 A | 2/2017 |

*Primary Examiner* — Behrang Badii
*Assistant Examiner* — Daniel L Greene
(74) *Attorney, Agent, or Firm* — Dinsmore & Shohl LLP

(57) ABSTRACT

A vehicle is configured to accommodate a cart and a passenger. A communication unit of the vehicle is configured to communicate with the cart. A traveling environment acquisition unit of the vehicle is configured to acquire a traveling environment of the vehicle. A cart control unit of the vehicle is configured to control an arrangement of the cart in the vehicle through the communication unit according to the traveling environment acquired toy the traveling environment acquisition unit.

7 Claims, 21 Drawing Sheets

(56) References Cited

U.S. PATENT DOCUMENTS

| | | | |
|---|---|---|---|
| 2004/0221790 A1* | 11/2004 | Sinclair | G01P 3/36 |
| | | | 116/62.1 |
| 2005/0192701 A1* | 9/2005 | Ben-Ezra | B07C 5/36 |
| | | | 700/213 |
| 2005/0247824 A1* | 11/2005 | Allison, Sr. | B64D 11/00 |
| | | | 244/137.2 |
| 2007/0001809 A1* | 1/2007 | Kodukula | G06K 7/0008 |
| | | | 340/10.1 |
| 2007/0045019 A1* | 3/2007 | Carter | B60T 7/16 |
| | | | 180/167 |
| 2007/0129849 A1* | 6/2007 | Zini | G05D 1/0238 |
| | | | 700/258 |
| 2008/0217475 A1* | 9/2008 | Allison | B64D 11/00 |
| | | | 244/114 R |
| 2009/0315704 A1* | 12/2009 | Rosing | G06Q 10/08 |
| | | | 340/539.13 |
| 2011/0178669 A1* | 7/2011 | Tanaka | G05D 1/0088 |
| | | | 701/25 |
| 2014/0088814 A1* | 3/2014 | You | G05D 1/0061 |
| | | | 701/23 |
| 2015/0006005 A1* | 1/2015 | Yu | G06Q 50/28 |
| | | | 701/22 |
| 2015/0229906 A1* | 8/2015 | Inacio De Matos | |
| | | | G05D 1/0246 |
| | | | 348/46 |
| 2016/0001748 A1* | 1/2016 | Moskowitz | B60L 50/66 |
| | | | 701/22 |
| 2017/0060234 A1* | 3/2017 | Sung | G06F 3/1431 |
| 2017/0200248 A1* | 7/2017 | Murphy | G06Q 50/28 |
| 2018/0283882 A1* | 10/2018 | He | H04W 4/024 |
| 2018/0354139 A1* | 12/2018 | Wang | G06Q 30/0635 |
| 2019/0073656 A1* | 3/2019 | Joseph | G06Q 20/40145 |

* cited by examiner

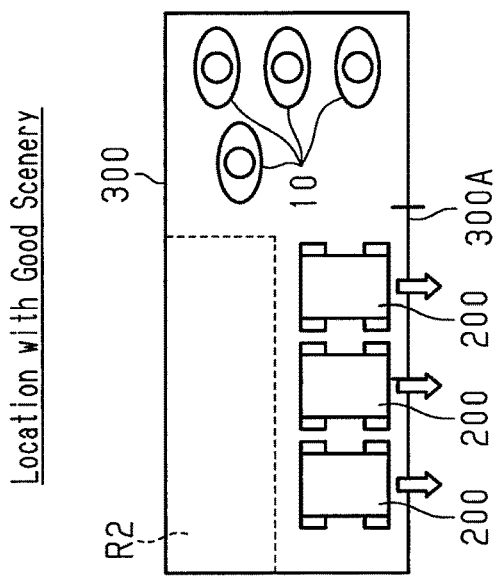
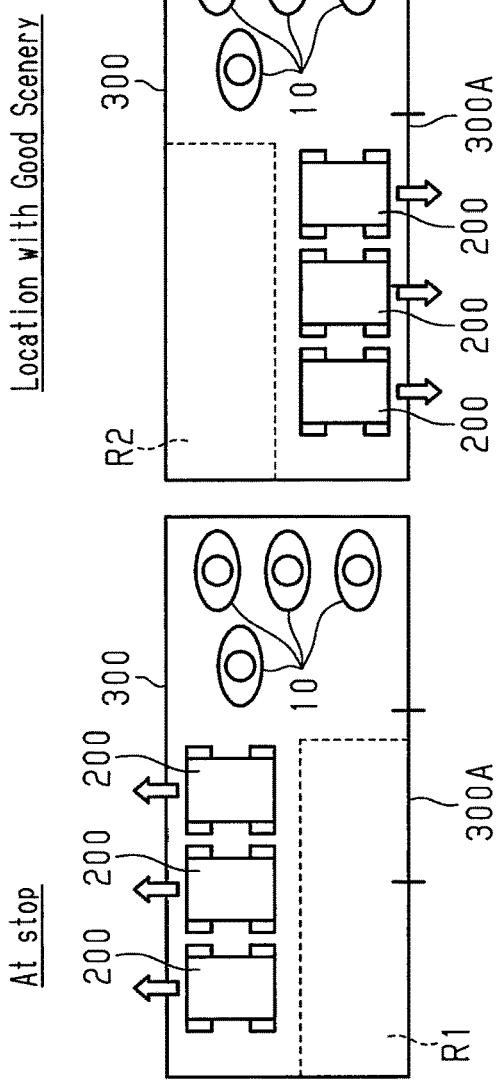
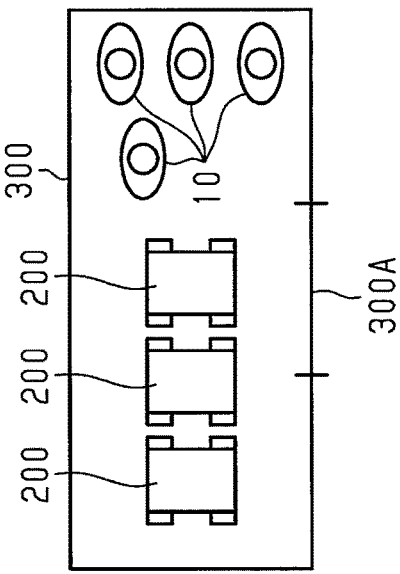

Fig.9

| Number of Passengers | Number of Carts | Size of Movement Allowable Range of Cart |
|---|---|---|
| 0 | 1 | 10 |
|   | 2 | 20 |
|   | ⋮ | ⋮ |
| 1 | 1 | 9 |
|   | 2 | 18 |
|   | ⋮ | ⋮ |
| 2 | 1 | 8 |
|   | 2 | 16 |
|   | ⋮ | ⋮ |
| 3 | 1 | 7 |
|   | 2 | 14 |
|   | ⋮ | ⋮ |
| ⋮ | ⋮ | ⋮ |

T1

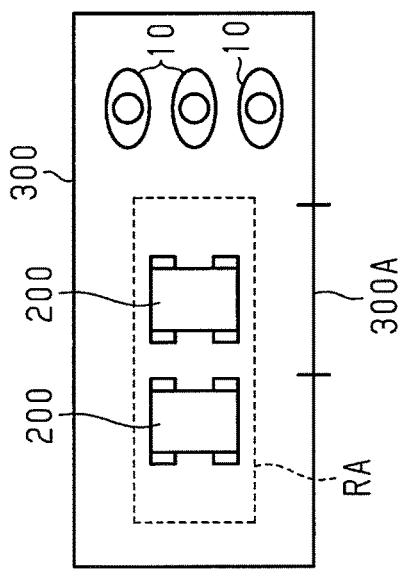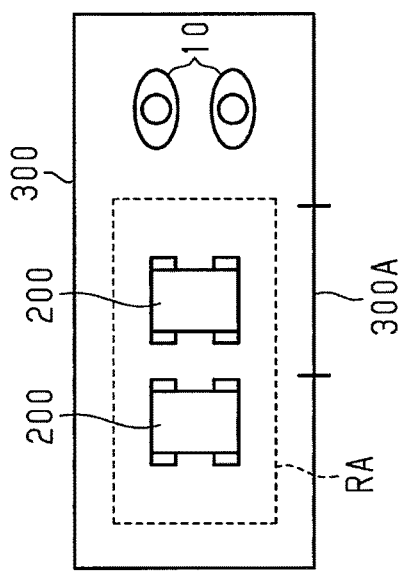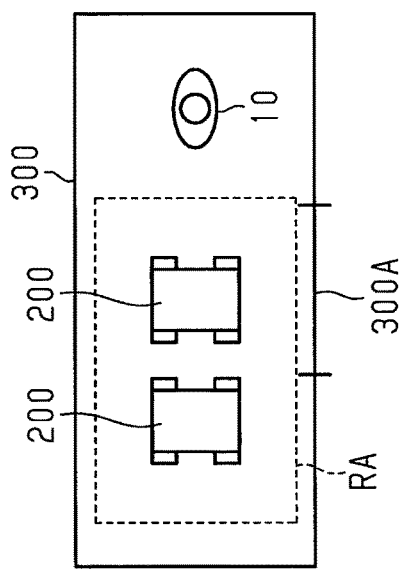

Fig.13

| Number of Passengers | Number of Carts (Baggage and Seat) | Number of Passengers Seated on Carts (seat) | Size of Movement Allowable Range of Cart T2 |
|---|---|---|---|
| 0 | 1 | 0 | 10 |
| | 2 | 0 | 20 |
| | ⋮ | ⋮ | ⋮ |
| 1 | 1 | 0 | 10 |
| | | 1 | 15 |
| | 2 | 0 | 20 |
| | | 1 | 30 |
| | ⋮ | ⋮ | ⋮ |
| 2 | 1 | 0 | 10 |
| | | 1 | 15 |
| | 2 | 0 | 20 |
| | | 1 | 25 |
| | | 2 | 30 |
| ⋮ | ⋮ | ⋮ | ⋮ |

Fig.17

| Type of Cart | Size of Cart | Distance from Passenger |
|---|---|---|
| Baggage (small) | Small | Short |
| Baggage (large) | Large | Long |
| Seat | Medium | Medium |
| ⋮ | ⋮ | ⋮ |

T3

VEHICLE AND CONTROL METHOD THEREOF

CROSS-REFERENCE TO RELATED APPLICATION

This application claims priority to Japanese Patent Application No. 2017-250206 filed on Dec. 26, 2017, incorporated herein by reference in its entirety.

BACKGROUND

The present disclosure relates to a vehicle simultaneously transporting carts and passengers, and to a control method thereof.

For example, Japanese Laid-Open Patent Publication No. 2006-69729 discloses a truck transporting movable cage carts with wheels attached to the lower end as an example of a vehicle having a transportation function of carts.

SUMMARY

However, when a vehicle simultaneously transports carts and passengers by using a common accommodation space, there is a restriction on the positions of the carts, the positions of the passengers, or the movement of the passengers in the accommodation space, and thus, the passengers are hindered from effectively using the accommodation space.

An objective of the present disclosure is to provide a vehicle capable of simultaneously transporting carts and passengers, in which the passengers are capable of effectively using the accommodation space, and a control method thereof.

Examples of the present disclosure will now be described.

Example 1

A vehicle configured to accommodate a cart and a passenger is provided. The vehicle includes a communication unit, which is configured to communicate with the cart, a traveling environment acquisition unit, which is configured to acquire a traveling environment of the vehicle, and a cart control unit, which is configured to control an arrangement of the cart in the vehicle through the communication unit according to the traveling environment acquired by the traveling environment acquisition unit.

With the configuration described above, for example, the arrangement of the carts is controlled according to the traveling environment of the vehicle, such as the arrival of the vehicle at a point for a passenger to get on or off. This allows the passenger move smoothly in the vehicle.

Example 2

The vehicle of Example 1 may further include a passenger detection unit, which is configured to detect an arrangement of the passenger in the vehicle. The cart control unit may be configured to control the arrangement of the cart in the vehicle according to the arrangement of the passenger detected by the passenger detection unit.

With the configuration described above, the arrangement of the carts is controlled according to the arrangement of the passengers. Therefore, the distance between the passenger and the cart in the vehicle is properly maintained, and thus, a boarding space or the passenger is ensured.

Example 3

In the vehicle of Example 2, the cart control unit may be configured to determine a size of a movement allowable range of the cart in the vehicle according to a number of carts acquired through the communication unit, and a number of passengers detected through the passenger detection unit.

With the configuration described above, for example, when the number of passengers in the vehicle is comparatively large, the size of the movement allowable range of the carts is limited. Therefore, the boarding space of the passengers is ensured.

Example 4

In the vehicle of Example 2, the cart may be one of a plurality of carts including a first cart for carrying baggage and a second cart for boarding the passenger. The cart control unit may be configured to, when the passenger detection unit detects the passenger, move the first cart to maintain a distance between the passenger and the first cart and move the second cart to cause the second cart to approach the passenger.

With the configuration described above, the distance between the passenger and the first cart is properly maintained, and thus, the boarding space of the passengers in the vehicle is ensured. Further, the second cart approaches the passenger, and thus, the boarding of the passenger on the second cart can be guided.

Example 5

In the vehicle of Example 4, the second cart may include a seating detection unit detecting seating of the passenger on the second cart. The communication unit may be configured to acquire information relevant to a presence or an absence of seating of the passenger on the second cart. The cart control unit may tea configured to determine a size of a movement allowable range of the cart the vehicle according to a total number of first carts and second carts acquired through the communication unit, a number of passengers detected through the passenger detection unit, and a number of passengers seated on the second cart.

With the configuration described above, the size of the movement allowable range of the cart in the vehicle is determined by factoring in the presence or the absence of the seating of the passenger on the second cart. Therefore, the boarding space of the passenger can be further ensured.

Example 6

A control method of a vehicle is provided that performs the various processes described in Examples 1 to 5.

Example 7

A non-transitory computer readable memory medium is provided that stores a program that causes a processor to perform the various processes described in Examples 1 to 5.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings:

FIG. 6A is a schematic view illustrating an example of the arrangement control of the carts in the cabin of the vehicle of FIG. 1;

FIG. 6B is a further schematic view illustrating an example of the arrangement control of the carts in the cabin of the vehicle of FIG. 1;

FIG. 6C is a further schematic view illustrating an example of the arrangement control of the carts in the cabin of the vehicle of FIG. 1;

FIG. 9 is a schematic view illustrating an example of a data table for defining the size of a movement allowable range of the carts of the vehicle of FIG. 8;

FIG. 10A is a schematic view illustrating an example of the arrangement control of the carts in the cabin of the vehicle of FIG. 8;

FIG. 10B is a schematic view illustrating an example of the arrangement control of the carts in the cabin of the vehicle of FIG. 8;

FIG. 10C is a schematic view illustrating an example of the arrangement control of the carts in the cabin of the vehicle of FIG. 8;

FIG. 13 is a schematic view illustrating an example of the data table for defining the size of the movement allowable range of the carts of the vehicle of FIG. 12;

FIG. 17 is a schematic view illustrating an example of a data table for defining the distance between a cart and a passenger in a vehicle according to a fifth embodiment;

DETAILED DESCRIPTION

First Embodiment

Hereinafter, a vehicle according to a first embodiment of the present disclosure will be described with reference to FIGS. 1 to 7.

Figure 1:
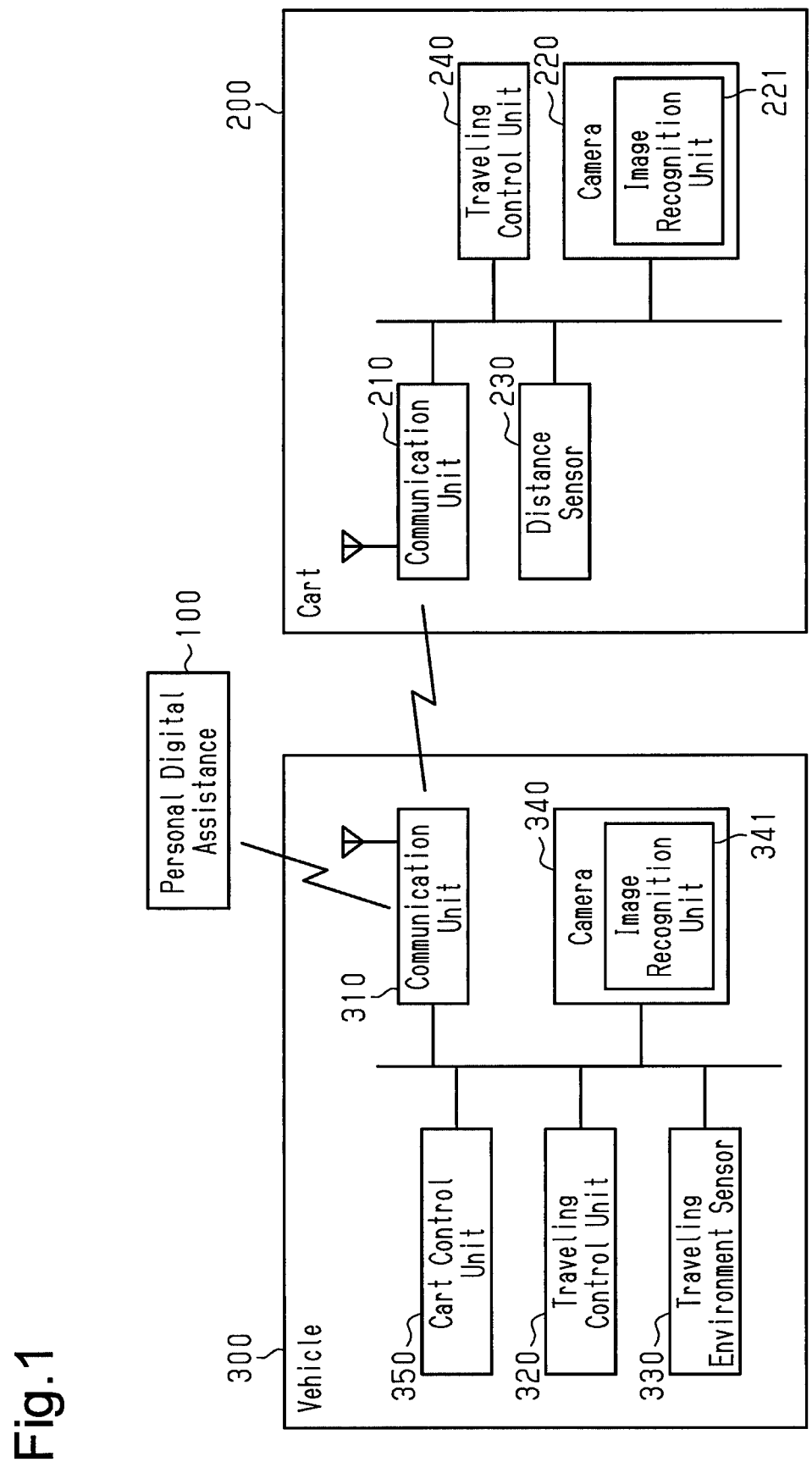
FIG. 1 is a block diagram illustrating a schematic configuration of a vehicle according to a first embodiment of the present disclosure.
Figure 2A:
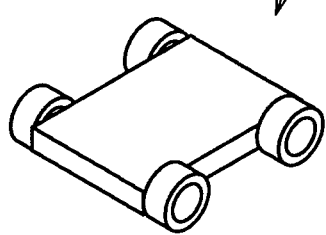
FIG. 2A is a schematic view illustrating an example of a usage mode of the cart illustrated in FIG. 1.
Figure 2B:
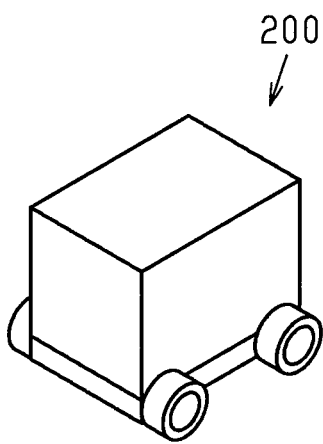
FIG. 2B is a schematic view illustrating an example of a usage mode of the cart illustrated in FIG. 1.
Figure 2C:
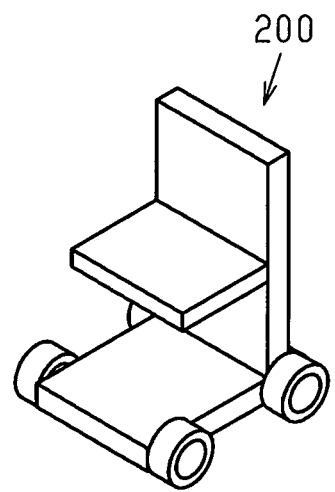
FIG. 2C is a schematic view illustrating an example of a usage mode of the cart illustrated in FIG. 1.

As illustrated in FIG. 1, a user manipulates a personal digital assistance 100, and thus, a vehicle 300 of this embodiment is dispatched to the position of the user. In addition, the vehicle of this embodiment accommodates a plurality of carts 200 carrying baggage in a cabin. As illustrated in FIG. 2A, the cart 200 includes four wheels and has an autonomous traveling function. In addition, examples of a usage mode of the cart 200 include a usage mode in which baggage is carried (refer to FIG. 2B) and a usage mode in which a passenger is seated (refer to FIG. 2).

More specifically, as illustrated in FIG. 1, the vehicle 300 includes a communication unit 310, a traveling control unit 320, a traveling environment sensor 330, a camera 340, and a cart control unit 350.

The communication unit 310 is capable of communicating with the personal digital assistance 100 and receives a request for dispatching the vehicle 300 from the personal digital assistance 100.

The traveling control unit 320 allows the vehicle 300 to autonomously travel according to a traveling route set in advance. Then, when the request for dispatching the vehicle 300 is received from the personal digital assistance 100 located on the traveling route of the vehicle 300, the traveling control unit 320 sets the corresponding position as a stop point of the vehicle 300.

The traveling environment sensor 330 functions as a traveling environment acquisition unit detecting a traveling environment of the vehicle 300. The traveling environment sensor 330, for example, is a navigation system, and compares the position of the vehicle 300 to be identified by a global positioning system (GPS), with attribution information for each area registered in map data, and thus, detects the traveling environment of the vehicle 300. The traveling environment sensor 330, for example, may acquire weather information, traffic information, terrain information, and the like from the outside of the vehicle, and may reflect the information on the attribution information for each area for detecting the traveling environment. In addition, the traveling environment sensor 330 may acquire history of dispatch of the vehicle 300 from the outside of the vehicle, and may reflect the history on the attribution information for each area for detecting the traveling environment. In addition, the traveling environment sensor 330 may acquire information relevant to the user who ordered the vehicle 300, from the communication unit 310, and may reflect the information relevant to the user on the traveling environment. The traveling environment sensor 330 may be any sensor insofar as having such functions, and is not limited to the navigation system.

An example of the traveling environment of the vehicle 300 is an environment determined by a route on which the vehicle 300 travels, such as a stop point of the vehicle 300 where passengers get on or off, a viewing point where the scenery is good, or a point where it is predicted that the sunlight is strong on the right in the traveling direction. In addition, an example of the traveling environment of the vehicle 300 is an environment determined by the user of the vehicle 300, such as the number of users who ordered the vehicle 300, the density of the users on the traveling route, who are expected to order the vehicle 300, or the age of the user who ordered the vehicle 300.

The camera 340 captures an image of the cabin, and an image recognition unit 341 performs image recognition processing on the captured image, and thus, the position of the passenger on the vehicle 300 is detected. That is, the camera 340 functions as a passenger detection unit detecting the arrangement of the passenger in the vehicle 300. The passenger detection unit can be realized by a configuration other than the camera 340.

The cart control unit 350 is capable of communicating with the carts 200 arranged in the cabin, and controls the arrangement of the carts 200 in the cabin.

The cart 200 includes a communication unit 210, a camera 220, a distance sensor 230, and a traveling control unit 240.

The communication unit 210 is capable of communicating the communication unit 310 of the vehicle 300, and acquires information relevant to movement control of the cart 200 from the cart control unit 350.

The camera 220 captures the image of the cabin from the viewpoint of the cart 200, and an image recognition unit 221 performs image recognition processing on the captured image, and thus, the position of passengers existing around the cart 200 is detected.

The distance sensor 230 is a non-contact type sensor and detects the distance between the passenger detected by the camera 220 and the cart 200.

The traveling control unit 240 controls the autonomous traveling of the cart 200 such that the distance between the passenger detected by the distance sensor 230 and the cart 200 is maintained (ensured) to be a predetermined distance.

Next, a control method of the arrangement of the carts 200 in the cabin will be described.

The cart 200 autonomously travels while maintaining a predetermined distance from the passenger, and thus, the arrangement of the carts 200 is changed according to the arrangement of the passengers in the cabin.

Figure 3A:
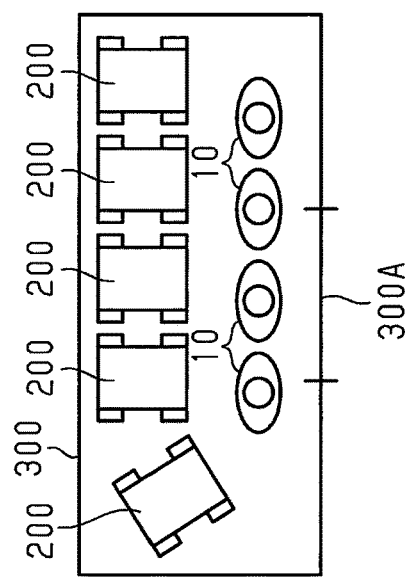
FIG. 3A is a schematic view illustrating an example of arrangement control of the carts in the cabin of the vehicle of FIG. 1.
Figure 3B:
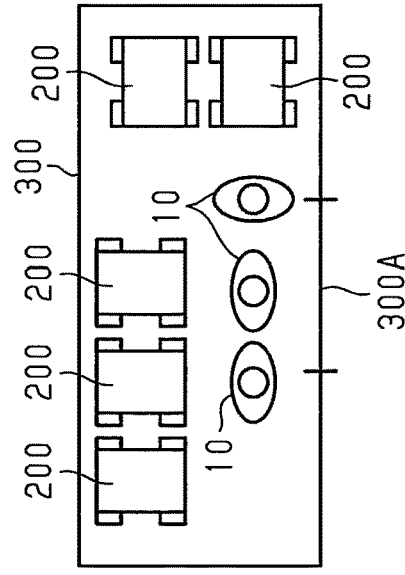
FIG. 3B is another schematic view illustrating an example of arrangement control of the carts in the cabin of the vehicle of FIG. 1.
Figure 3C:
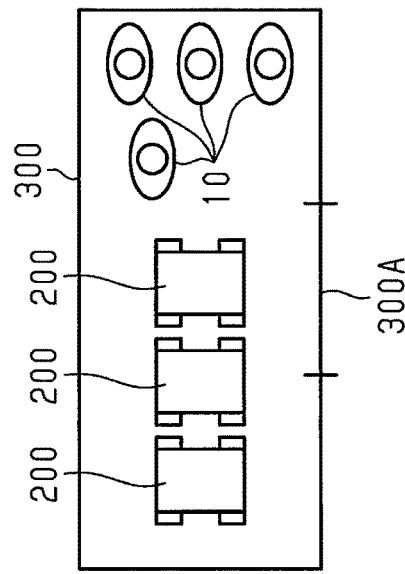
FIG. 3C is another schematic view illustrating an example of arrangement control of the carts in the cabin of the vehicle of FIG. 1.

Specifically, as illustrated in FIG. 3A, when passengers 10 are closely spaced in the rear end area of the cabin (the right side in the same drawing), the carts 200 are arranged in parallel in the front area of the cabin (the left side in the same drawing). In addition, as illustrated in FIG. 3B, when the passengers 10 are closely spaced in the vicinity of the entrance 300A of the vehicle 300, the carts 200 are arranged by being dispersed in another area. In addition, as illustrated in FIG. 3C, when the passengers 10 are arranged in parallel in a side end area of the cabin (the lower side in the same drawing), the carts 200 are arranged in parallel in the opposite side end area in the cabin (the upper side in the same drawing).

Figure 4A:
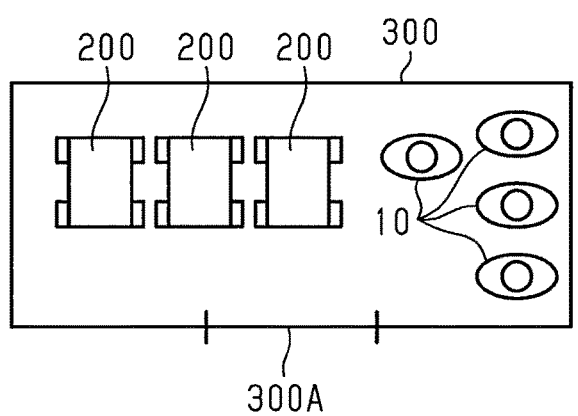
FIG. 4A is a schematic view illustrating an example of the arrangement control of the carts in the cabin of the vehicle of FIG. 1.
Figure 4B:
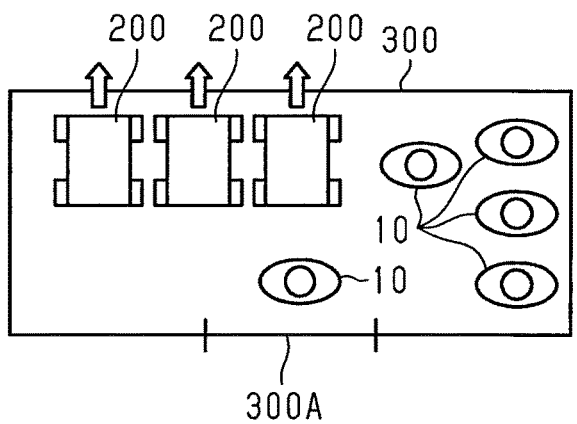
FIG. 4B is another schematic view illustrating an example of the arrangement control of the carts in the cabin of the vehicle of FIG. 1.

In addition, as illustrated by comparing FIG. 4A with FIG. 4B, when a passenger 10 newly enters the entrance 300A of the vehicle 300 (FIG. 4B) in a state where the carts 200 are arranged in parallel in the front area of the cabin (the left side in the same drawing) (FIG. 4A), the carts 200 are moved to retain a predetermined distance from the new passenger 10 (moved to the side opposite to the entrance 300A as illustrated by the blank arrows in FIG. 4B). When it is predicted that a new passenger 10 will get on the vehicle 300, the carts 200 may be moved in advance to the arrangement illustrated in FIG. 4B from the arrangement illustrated in FIG. 4A, such that a space that is not occupied by the carts 200 becomes wider in the front area of the cabin including the periphery of the entrance 300A. At this time, the carts 200 may be moved in advance such that a wider space is vacant as the number of new passengers 10 increases.

Figure 5A:
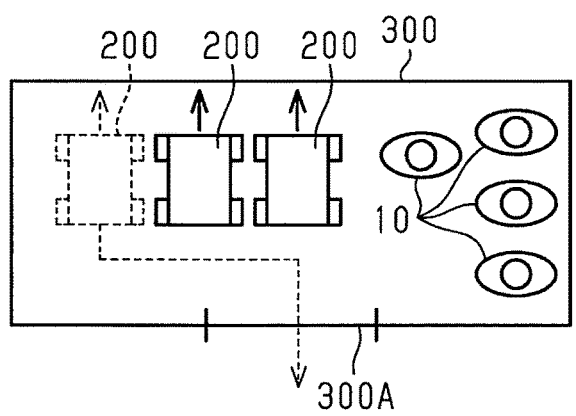
FIG. 5A is a schematic view illustrating an example of the arrangement control of the carts in the cabin of the vehicle of FIG. 1.
Figure 5B:
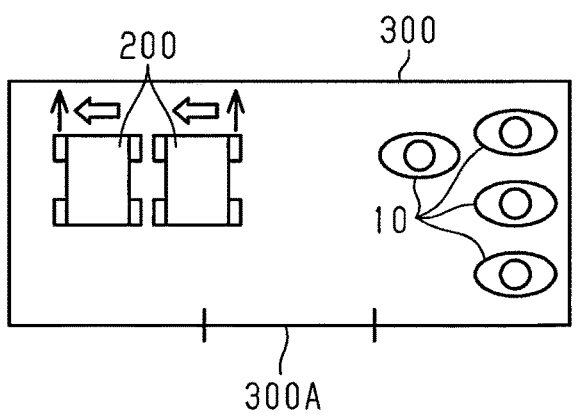
FIG. 5B is another schematic view illustrating an example of the arrangement control of the carts in the cabin of the vehicle of FIG. 1.

In addition, as illustrated by comparing FIG. 5A with FIG. 5B, when a part of the carts 200 (the cart illustrated by the dotted line in the same drawing left end) gets off the vehicle 300 when the vehicle 300 is stopped in a state where the carts 200 are arranged in parallel in the front area of the cabin (the left side in the same drawing) (FIG. 5A), the other carts 200 are moved to fill the vacant space (moved to the front as illustrated by the blank arrows in FIG. 5B).

In addition, as illustrated by comparing FIG. 6A with FIG. 6B, when the vehicle 300 is stopped in a state where the carts 200 are arranged in parallel in the front area of the cabin (the left side in the same drawing) (FIG. 6A), the carts 200 are moved such that a vacant space R1 is formed in the vicinity of the entrance 300A of the vehicle 300 (moved to the side opposite to the entrance 300A as illustrated by the blank arrows in FIG. 6B).

In addition, as illustrated by comparing FIG. 6A with FIG. 6C, when a location with a good scenery exists on the lateral side of the traveling position of the vehicle 300 (the upper side in the same drawing) in a state where the carts 200 are arranged in parallel in the front area of the cabin (the left side in the same drawing), the other carts 200 are moved such that a vacant space R2 suitable for enjoying the scenery is formed in the cabin (moved to the lower side, as illustrated by the blank arrows in FIG. 6C). In addition, when a location with strong sunlight exists on the lateral side of the traveling position of the vehicle 300 (the lower side in the same drawing), the other carts 200 are moved such that a space where sunlight favorable for the passengers 10 on board is obtained (the space R2 in FIG. 6C).

Next, in this embodiment, a flow of processing when the arrangement of the carts 200 in the cabin is controlled will be described.

In the following description, when the vehicle 300 is described to perform an operation, the actual agent of the operation may be a vehicle, processor incorporated in the vehicle 300. Specifically, when the vehicle 300 is described to perform various types of operations, the vehicle processor may execute programs stored in the memory of the vehicle 300. Based on the instruction from the vehicle processor, various types of devices incorporated in the vehicle 300 may execute operations. That is, "the vehicle processor or various types of devices of the vehicle 3 300 execute various types of operations" may be hereinafter simply referred to as "the vehicle 300 performs various types of operations." In the same manner, when the cart 200 is described to perform an operation, the actual agent of the operation may be a cart processor incorporated in the cart 200. Specifically, when the cart 200 is described to perform various types of operations, the cart processor may execute programs stored in the memory of the cart 200. Based on the instruction from the cart processor, various types of devices incorporated in the cart 200 may execute operations. That is, "the cart processor or various types of devices of the cart 200 execute various types of operations" may be hereinafter simply referred to as "the cart 200 performs various types of operations."

Figure 7:
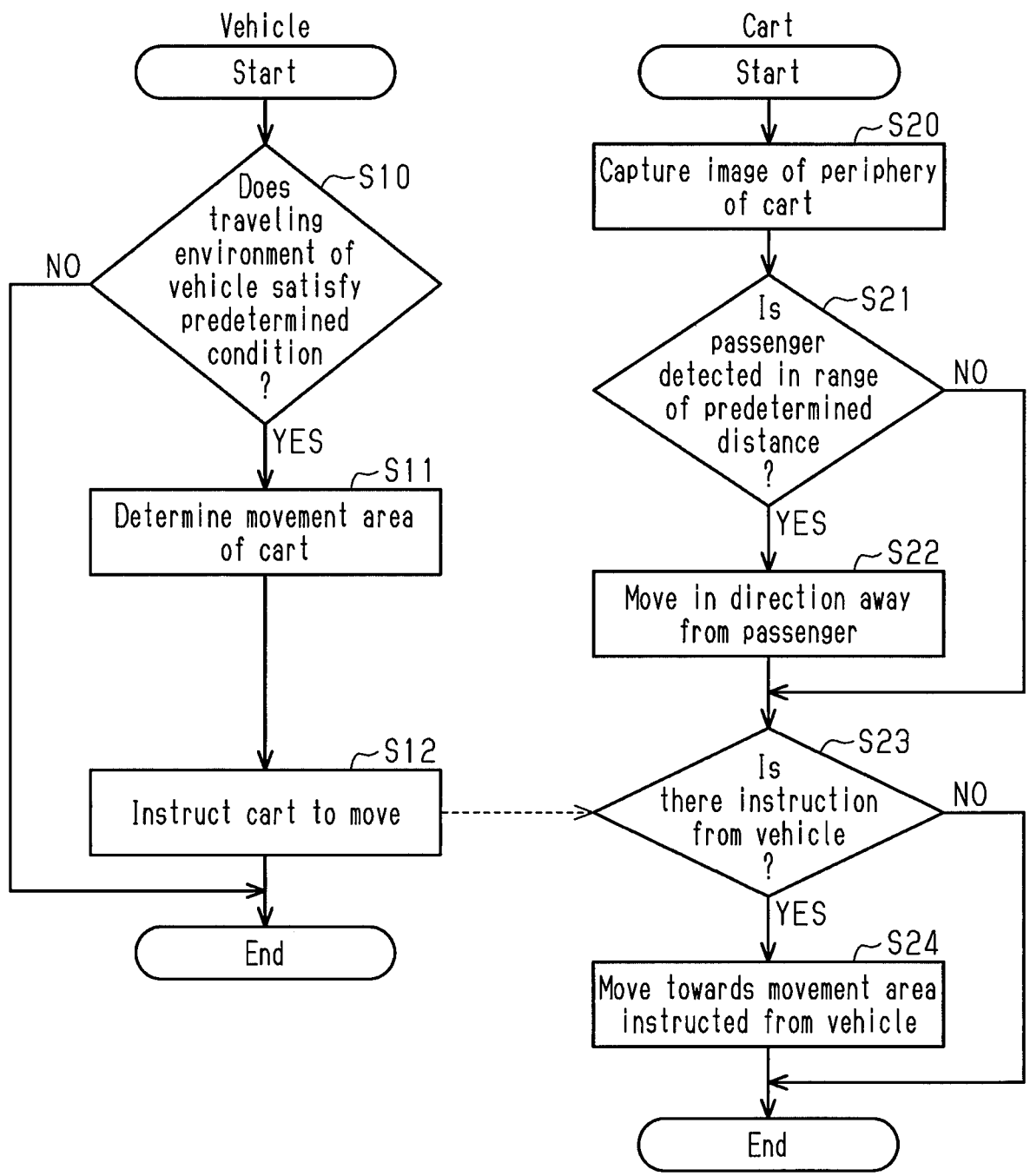
FIG. 7 is a flowchart illustrating the flow of processing when the vehicle of FIG. 1 controls the arrangement of the carts in the cabin.

As illustrated in FIG. 7, the vehicle 300 first determines whether or not the traveling environment of the vehicle 300, which is acquired through the traveling environment sensor 330, satisfies a predetermined condition (Step S10). The predetermined condition, for example, can be set to correspond to the traveling environment of the vehicle 300, such as the arrival of the vehicle 300 to a point where passengers get on or off.

Then, when it is determined that the traveling environment of the vehicle 300 does not satisfy the predetermined condition (Step S10: NO), the vehicle 300 ends the arrangement control of the carts 200 illustrated in FIG. 7.

In contrast, when it is determined that the traveling environment of the vehicle 300 satisfies the predetermined condition (Step S10: YES), the vehicle 300 determines a movement area of the carts 200 in the cabin (Step S11).

Then, the vehicle 300 instructs the carts 200 to move on the basis of the movement area determined in Step S11 described above (Step S12).

On the other hand, the cart 200 captures images of the periphery of the cart 200 through the camera 220 (Step S20).

Then, when a passenger is detected in a range of a predetermined distance from the cart 200 itself through capturing images of the periphery of the cart 200 (Step S21: YES), the cart 280 is moved in a direction away from the passenger to maintain (ensure) a predetermined distance between the cart 200 itself and the passenger (Step 22).

In contrast, when no passenger is detected in the range of the predetermined distance (Step S21: NO), the cart 200 skips the processing of Step S22.

After that, when the instruction of the movement is received from the vehicle 300 (Step S23: YES), the carts 200 move towards the movement area instructed from the vehicle 300 (Step S24), and then, ends the arrangement control of the cart 200 illustrated in FIG. 7.

In contrast, when there is no instruction from the vehicle 300 (Step S23: NO), the cart 200 ends the arrangement control of the cart 200 illustrated in FIG. 7 without performing the processing of Step S24.

As described above, the first embodiment has the following advantages.

(1) For example, when a passenger 10 gets on or off, the arrangement of the carts 200 is controlled according to the traveling environment of the vehicle 300. Therefore, it is possible to allow the passengers 10 to move smoothly in the vehicle 300.

(2) The arrangement of the carts 200 is controlled according to the arrangement of the passengers 10. Therefore, it is possible to ensure a boarding space of the passengers 10 in the vehicle 300 while properly maintaining the distance between the passengers 10 and the carts 200 in the vehicle 300.

Second Embodiment

Next, a vehicle according to a second embodiment will be described with reference to FIGS. 8 to 11. The second embodiment is different from the first embodiment in that the size of the movement allowable range of the cart is changed according to the number of passengers and the number of carts. Therefore, in the following description, configurations different from those of the first embodiment will be mainly described, and the repeated description of the same configurations as those of the first embodiment or the corresponding configurations to those of the first embodiment will be omitted.

Figure 8:
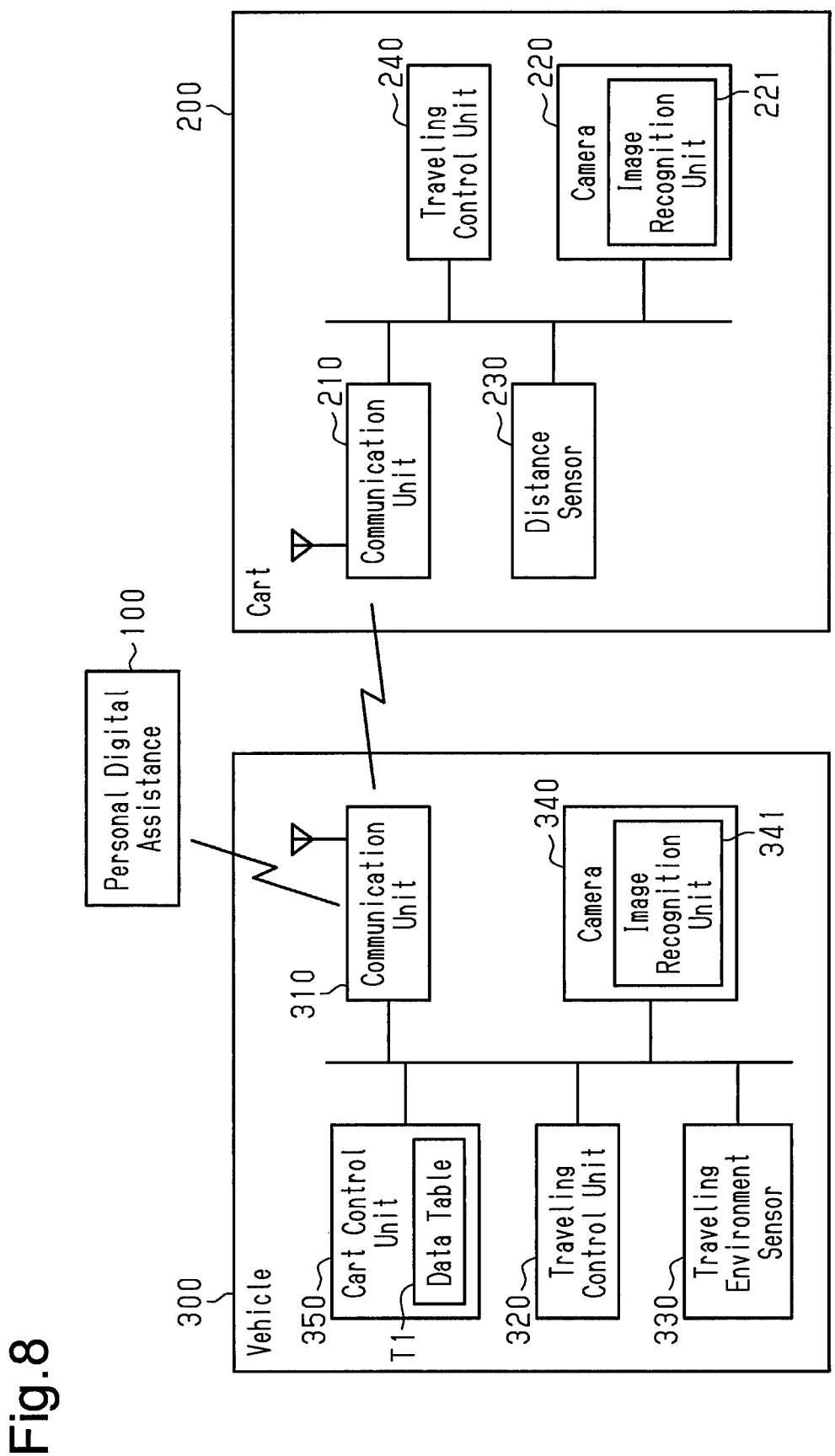
FIG. 8 is a block diagram illustrating a schematic configuration of a vehicle according to a second embodiment.

As illustrated in FIG. 8, in this embodiment, the cart control unit 350 of the vehicle 300 includes a data table T1 in which a relationship between the number of passengers and the number of carts 200, and the size of the movement allowable range of the cart 200 is defined. The "movement allowable range of the cart 200" indicates a range in which the movement area of the cart 200 is allowed to be set.

As illustrated in FIG. 9, in the data table T1, when the number of passengers is the same, the size of the movement allowable range of the cart 200 tends to increase as the number of carts 200 increases. In addition, in the data table T1, when the number of carts 200 is the same, the size of the movement allowable range of the cart 200 tends to decrease as the number of passengers increases.

For this reason, as illustrated by comparing FIGS. 10A to 10C with each other, even in a case where the number of carts 200 arranged in the cabin is the same (two units in the same drawing), the size of a movement allowable range RA of the cart 200 decreases as the number of passengers 10 in the cabin increases.

Next, in this embodiment, a flow of processing when the arrangement of the carts 200 in the cabin is controlled will be described.

Figure 11:
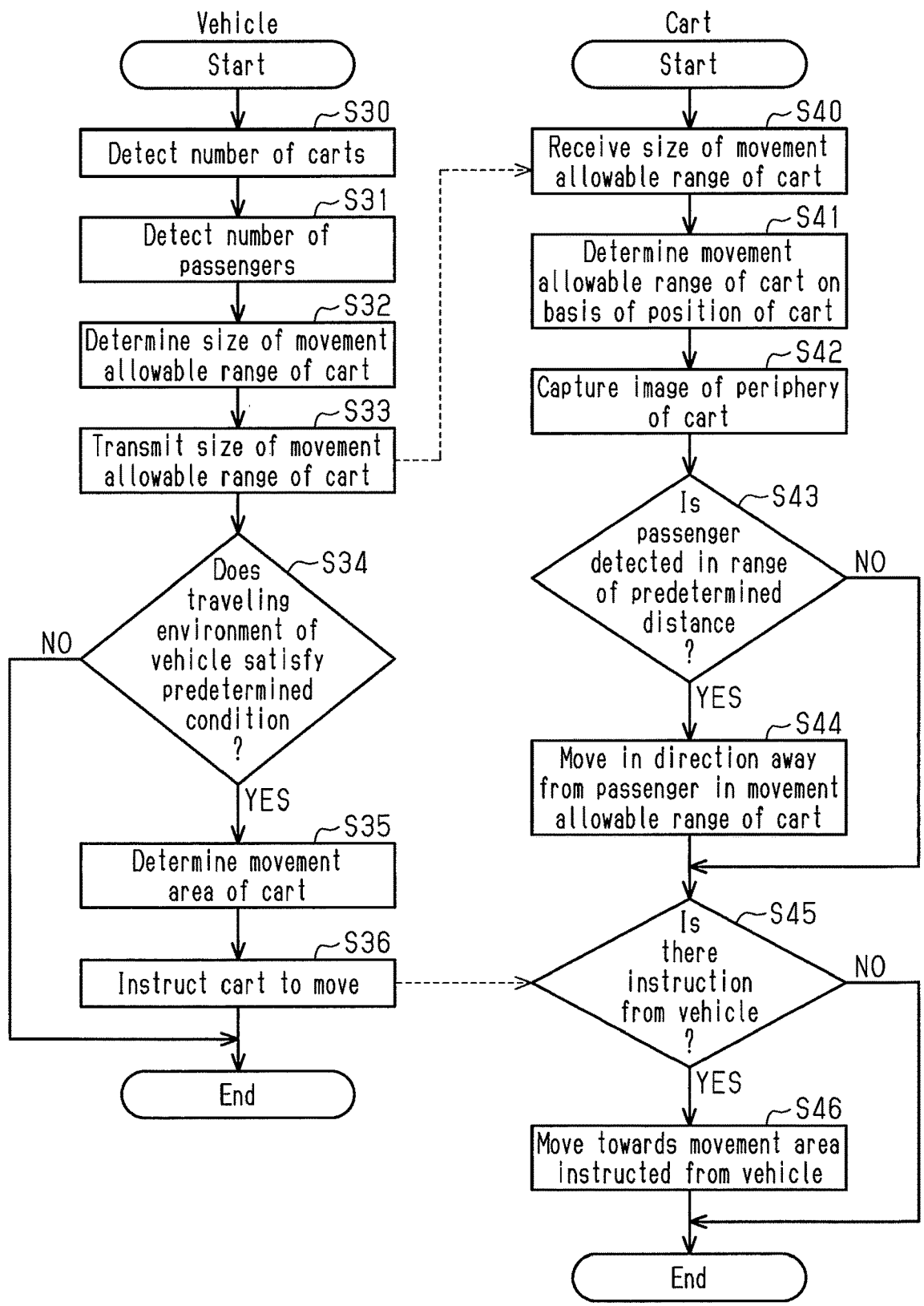
FIG. 11 is a flowchart illustrating the flow the processing when the vehicle of FIG. 8 controls the arrangement of the carts in the cabin.

As illustrated in FIG. 11, the vehicle 300 first detects the number of carts 200 arranged in the cabin on the basis of signals acquired from each of the carts 200 by the communication unit 310 (Step S30).

Subsequently, the vehicle 300 detects the number of passengers arranged in the cabin on the basis of the images captured through the camera 340 (Step S31).

Next, in the vehicle 300, the cart control unit 350 determines the size of the movement allowable range of the cart 200 with reference to the data table T1 on the basis of the number of carts 200 and the number of passengers 10 detected in Step S30 or Step S31 described above (Step S32).

In addition, the vehicle 300 transmits the size of the movement allowable range, which is determined in Step S32 described above, to the cart 200 (Step S33).

Subsequently, the vehicle 300 determines whether or not the traveling environment of the vehicle 300, which is acquired through the traveling environment sensor 330, satisfies a predetermined condition (Step S34).

Then, when it is determined that the traveling environment of the vehicle 300 does not satisfy the predetermined condition (Step S34: NO), the vehicle 300 ends the arrangement control of the cart 200 illustrated in FIG. 11.

In contrast, when it is determined that the traveling environment of the vehicle 300 satisfies the predetermined condition (Step S34: YES), the vehicle 300 determines the movement area of the cart 200 in the cabin (Step S35).

Then, the vehicle 300 instructs the cart 200 to move on the basis of the movement area determined in Step S35 described above (Step S36).

When receiving the size of the movement allowable range of the cart 200 from the vehicle 300 (Step S40), the cart 200 determines the movement allowable range of the cart 200 with reference to the position of the cart 200 on the basis of the received size (Step S41).

Subsequently, the cart 200 captures images of the periphery of the cart 200 through the camera 220 (Step S42).

Then, when a passenger 10 is detected in the range of a predetermined distance from the cart 200 itself through capturing images of the periphery of the cart 200 (Step S43: YES), the cart 200 is moved in a direction away from the passenger 10 in the range of the movement allowable range determined in Step S41 described above to maintain a predetermined distance between the cart 200 itself and the passenger 10 (Step S44).

In contrast, when no passenger is detected in the range of the predetermined distance (Step S43: NO), the cart 200 skips the processing of Step S44.

After that, when the instruction of the movement is received from the vehicle 300 (Step S45: YES), the cart 200 is moved towards the movement area instructed from the vehicle 300 (Step S46), and then, ends the arrangement control of the cart 200 illustrated in FIG. 7.

In contrast, when there is no instruction from the vehicle 300 (Step S45: NO), the cart 200 ends the arrangement control of the cart 200 illustrated in FIG. 11 without performing the processing of Step S46.

As described above, the second embodiment has the following advantage in addition to the advantages (1) and (2) of the first embodiment.

(3) The vehicle 300 determines the size of the movement allowable range of the carts 200 according to the number of carts 200 and the number of passengers 10 in the cabin. For example, when the number of passengers 10 in the cabin is comparatively large, the size of the movement allowable range of the carts 200 is limited, and thus, the boarding space of the passengers 10 can be ensured.

Third Embodiment

Next, a vehicle according to a third embodiment will be described with reference to FIGS. 12 to 15. The third embodiment is different from the second embodiment in that the size of the movement allowable range of the carts is determined in consideration of the presence or absence of the seating of the passenger on the cart. Therefore, in the following description, configurations different from those of the second embodiment will be mainly described, and the repeated description of the same configurations as those of the second embodiment or the corresponding configurations to those of the second embodiment will be omitted.

Figure 12:
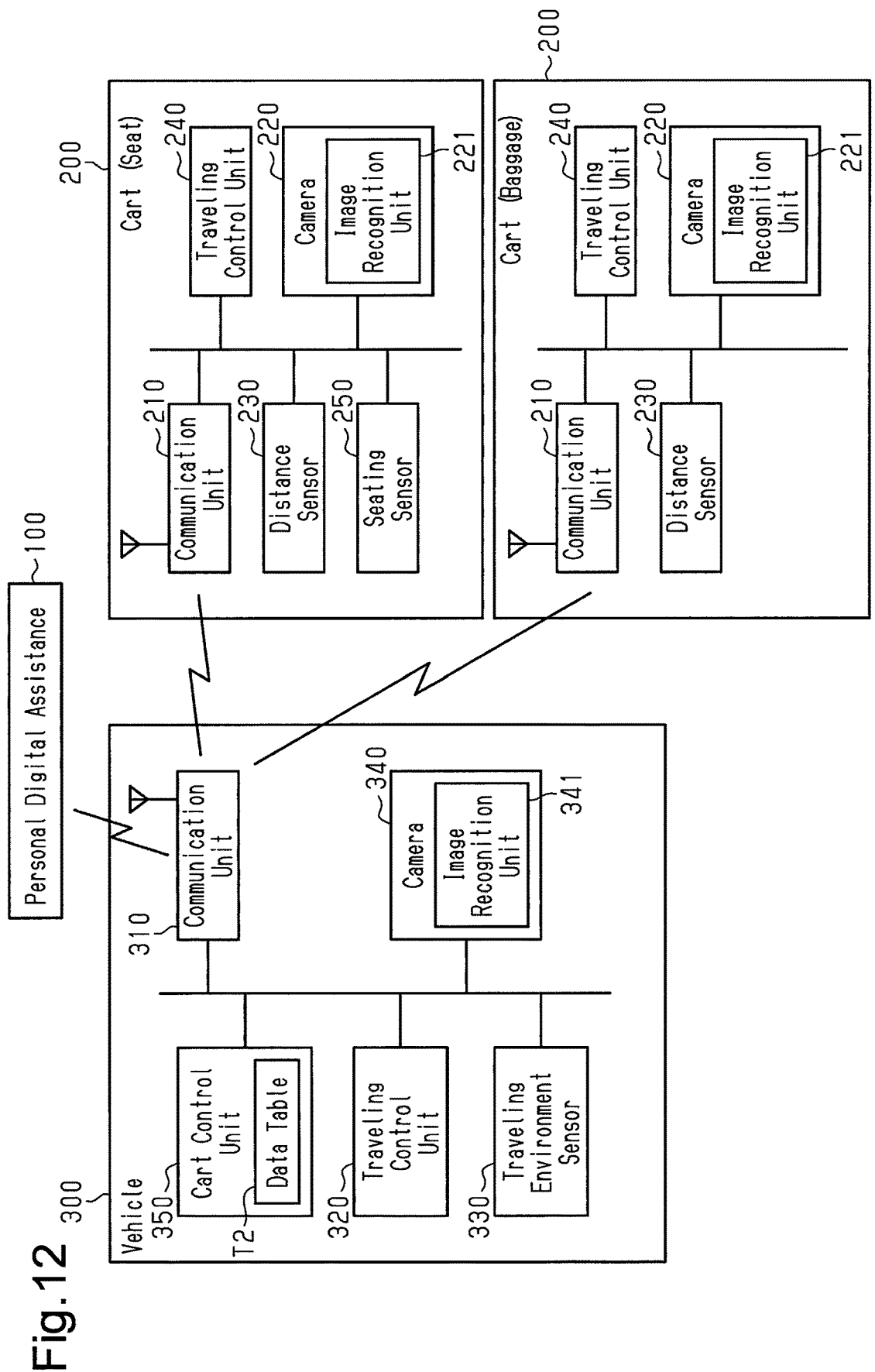
FIG. 12 is a block diagram illustrating a schematic configuration of a vehicle according to a third embodiment.

As illustrated in FIG. 12, the communication unit 310 of the vehicle 300 is capable of communicating with the communication unit 210 of the cart 200 of which the usage mode is "seat" and is capable of communicating with the communication unit 210 of the cart 200 of which the usage mode is "carry baggage". The cart 200 of which the usage mode is "carry baggage" corresponds to the "first cart" described in SUMMARY, and the cart 200 of which the usage mode is "seat" corresponds to the "second cart" described in SUMMARY.

The cart 200 of which the usage mode is "seat" includes a seating sensor 250 in addition to the communication unit 210, the camera 220, the distance sensor 230, and the traveling control unit 240. The seating sensor 250 functions as a seating detection unit detecting the presence or absence of the seating of the passenger on the cart 200 of which the usage mode is "seat". In contrast, the cart 200 of which the usage mode is "carry baggage" does not include the seating sensor 250 described above.

In addition, as illustrated in FIG. 13, in this embodiment, in a data table T2 of the cart control unit 350, when the number of passengers 10 is the same, the size of the movement allowable range RA of the cart 200 tends to increase as the total number of carts 200 of which the usage mode is "carry baggage" and carts 200 of which the usage mode is "seat" increases. In addition, in the data table T2, when the total number of carts 200 of which the usage mode is "carry baggage" and carts 200 of which the usage mode is "seat" is the same, there is a portion where it is observed that the size of the movement allowable range RA of the cart 200 tends to decrease as the number of passengers 10 increases. In addition, when the total number of carts 200 of which the usage mode is "carry baggage" and carts 200 of which the usage mode is "seat" is the same, the size of the movement allowable range RA of the cart 200 tends to increase as the number of the passengers seating on the cart 200 of which the usage mode is "seat" increases.

Figure 14A:
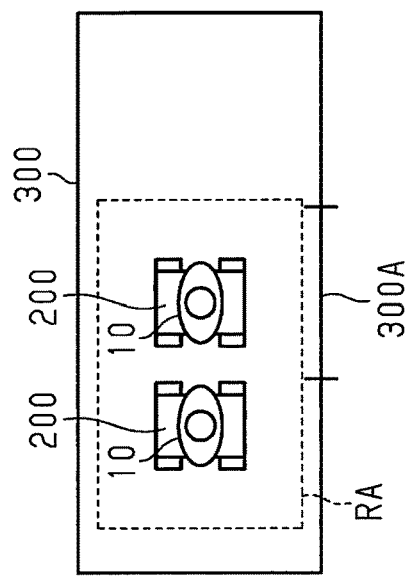
FIG. 14A is a schematic view illustrating an example of the arrangement control of the carts in the cabin of the vehicle of FIG. 12.
Figure 14B:
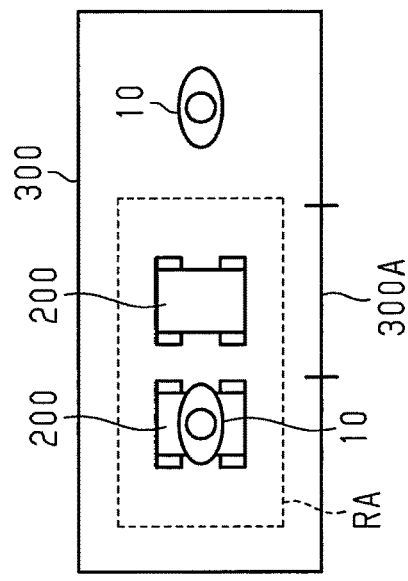
FIG. 14B is another schematic view illustrating an example of the arrangement control of the carts in the cabin of the vehicle of FIG. 12.
Figure 14C:
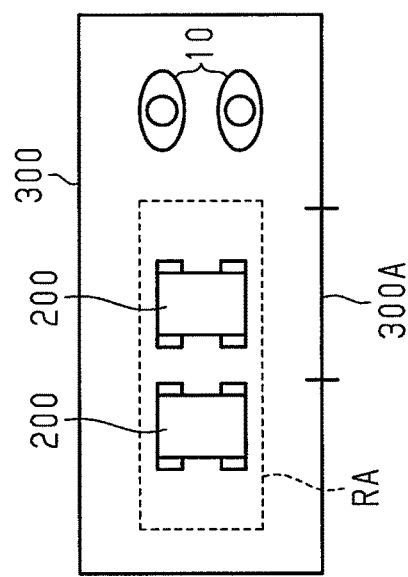
FIG. 14C is another schematic view illustrating an example of the arrangement control of the carts in the cabin of the vehicle of FIG. 12.

For this reason, as illustrated by comparing FIGS. 14A to 14C with each other, even in a case where the total number of carts 200 arranged in the cabin is the same (two units in the same drawing), and the number of passengers 10 arranged in the cabin is the same (two people in the same drawing), the size of the movement allowable range RA of the cart 200 increases as the number of passengers 10 seated on the cart 200 of which the usage mode is "seat" increases.

Next, in this embodiment, a flow of processing when the arrangement of the cart 200 in the cabin is controlled will be described.

Figure 15:
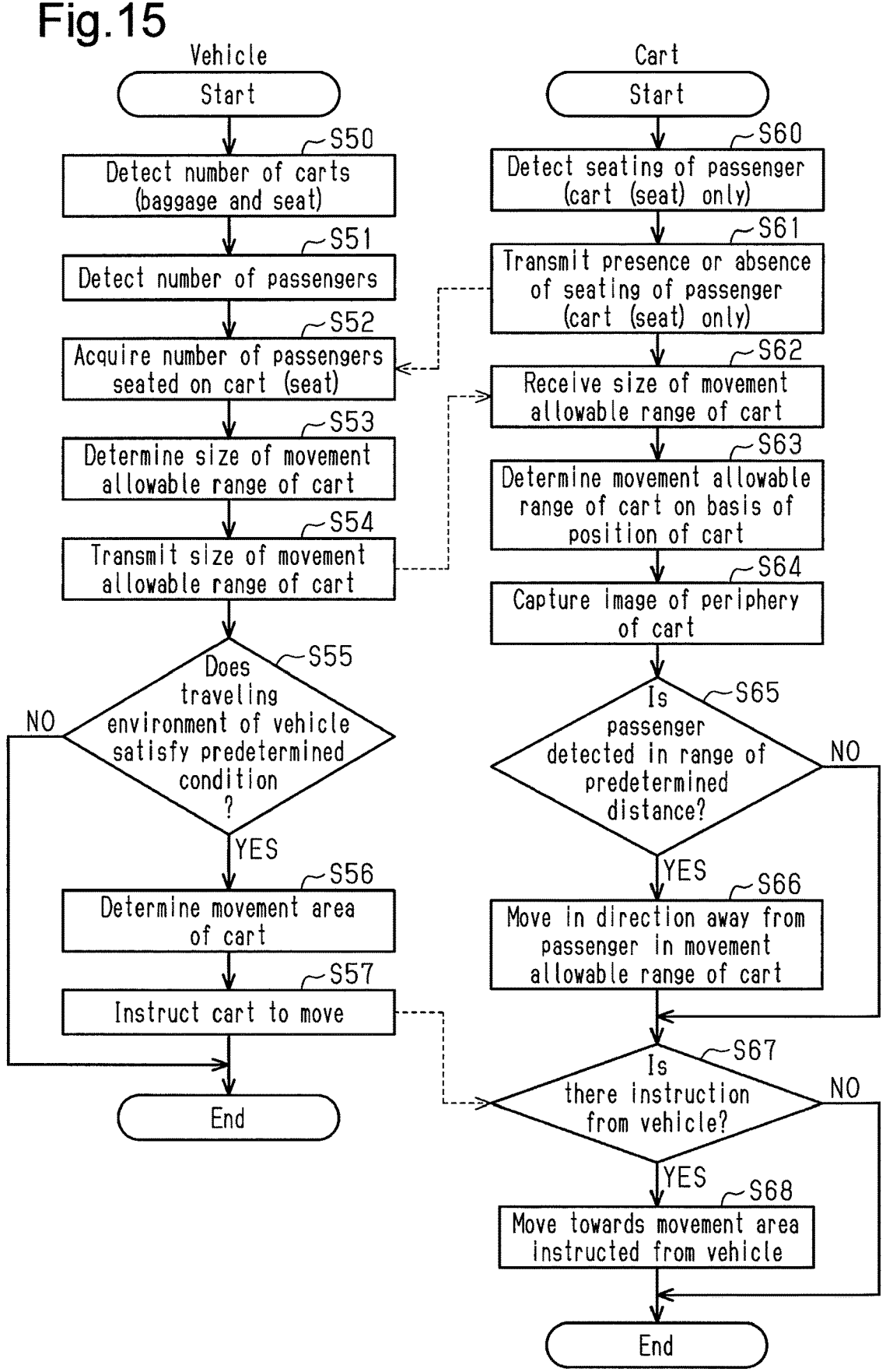
FIG. 15 is a flowchart illustrating a flow of processing when the vehicle of FIG. 12 controls the arrangement of the carts in the cabin.

As illustrated in FIG. 15, the vehicle 300 first detects the number of carts 200 arranged in the cabin on the basis of the signal acquired from each of the carts 200 by the communication unit 210 (Step S50).

Subsequently, the vehicle 300 detects the number of passengers 10 arranged in the cabin on the basis of image captured through the camera 220 (Step S51).

In contrast, the cart 200 of which the usage mode is "seat" detects the seating of the passenger 10 on the cart 200 itself through the seating sensor 250 (Step S60).

Subsequently, the cart 200 transmits the signal regarding the presence or absence of the seating of the passenger detected in Step S60 described above, to the vehicle 300 (Step S61).

In addition, the vehicle 300 acquires the number of passengers seated on the cart 200 on the basis of the signal received from the cart 200 (Step S52).

Next, in the vehicle 300, the cart control unit 350 determines the size of the movement allowable range of the cart 200 with reference to the data table T2 on the basis of the number of carts 200 and the number of passengers 10 detected in Step S50 or Step S51 described above, and the number of passengers 10 seated on the cart 200, acquired in Step S52 described above (Step S53).

In addition, the vehicle 300 transmits the size of the movement allowable range, determined in Step S53 described above, to the cart 200 (Step S54).

Subsequently, the vehicle 300 determines whether or not the traveling environment of the vehicle 300, acquired through the traveling environment sensor 330, satisfies a predetermined condition (Step S55).

Then, when it is determined that the traveling environment of the vehicle 300 does not satisfy the predetermined condition (Step S55: NO), the vehicle 300 ends the arrangement control of the cart 200 illustrated in FIG. 15.

In contrast, when it is determined that the traveling environment of the vehicle 300 satisfies the predetermined condition (Step S55: YES), the vehicle 300 determines the movement area of the cart 200 in the cabin (Step S56).

Then, the vehicle 300 instructs the cart 200 to move on the basis of the movement area determined in Step S56 described above (Step S57).

On the other hand, when receiving the size of the movement allowable range of the cart 200 from the vehicle 300 (Step S62), the cart 200 determines the movement allowable range of the cart 200 with reference to the position of the cart 200 on the basis of the received size (Step S63).

Subsequently, the cart 200 captures images of the periphery of the cart 200 through the camera 220 (Step S64).

Then, when a passenger 10 is detected in the range of a predetermined distance from the cart 200 itself through capturing images of the periphery of the cart 200 (Step S65: YES), the cart 200 is moved in a direction away from the passenger 10 in the range of the movement allowable range determined in Step S63 described above to maintain (ensure) a predetermined distance between the cart 200 itself and the passenger 10 (Step S66).

In contrast, when no passenger is detected in the range of the predetermined distance (Step S65: NO), the cart 200 skips the processing of Step S66.

After that, when the instruction of the movement, is received from the vehicle 300 (Step S67: YES), the cart 200 is moved towards the movement area instructed from the vehicle 300 (Step S68), and then, ends the arrangement control of the cart 200 illustrated in FIG. 15.

In contrast, when there is no instruction from the vehicle 300 (Step S67: NO), the cart 200 ends the arrangement control of the cart 200 illustrated in FIG. 15 without performing the processing of Step S68.

As described above, the third embodiment has the following advantage in addition to the advantages (1) and (2) of the first embodiment.

(4) The size of the movement allowable range of the carts 200 in the cabin is determined by factoring in the presence or absence of the seating of a passenger 10 on the cart 200 of which the usage mode is "seat". Therefore, the boarding space of the passengers 10 can be further ensured.

Fourth Embodiment

Next, a vehicle according to a fourth embodiment will be described with reference to FIG. 16. The fourth embodiment is different from the first embodiment in that when a passenger gets on the vehicle, a cart of which the usage mode is "seat" approaches the passenger. Therefore, in the following description, configurations different from those of the first embodiment will be mainly described, and the repeated description of the same configurations as those of the first embodiment or the corresponding configurations to those of the first embodiment will be omitted.

Figure 16:
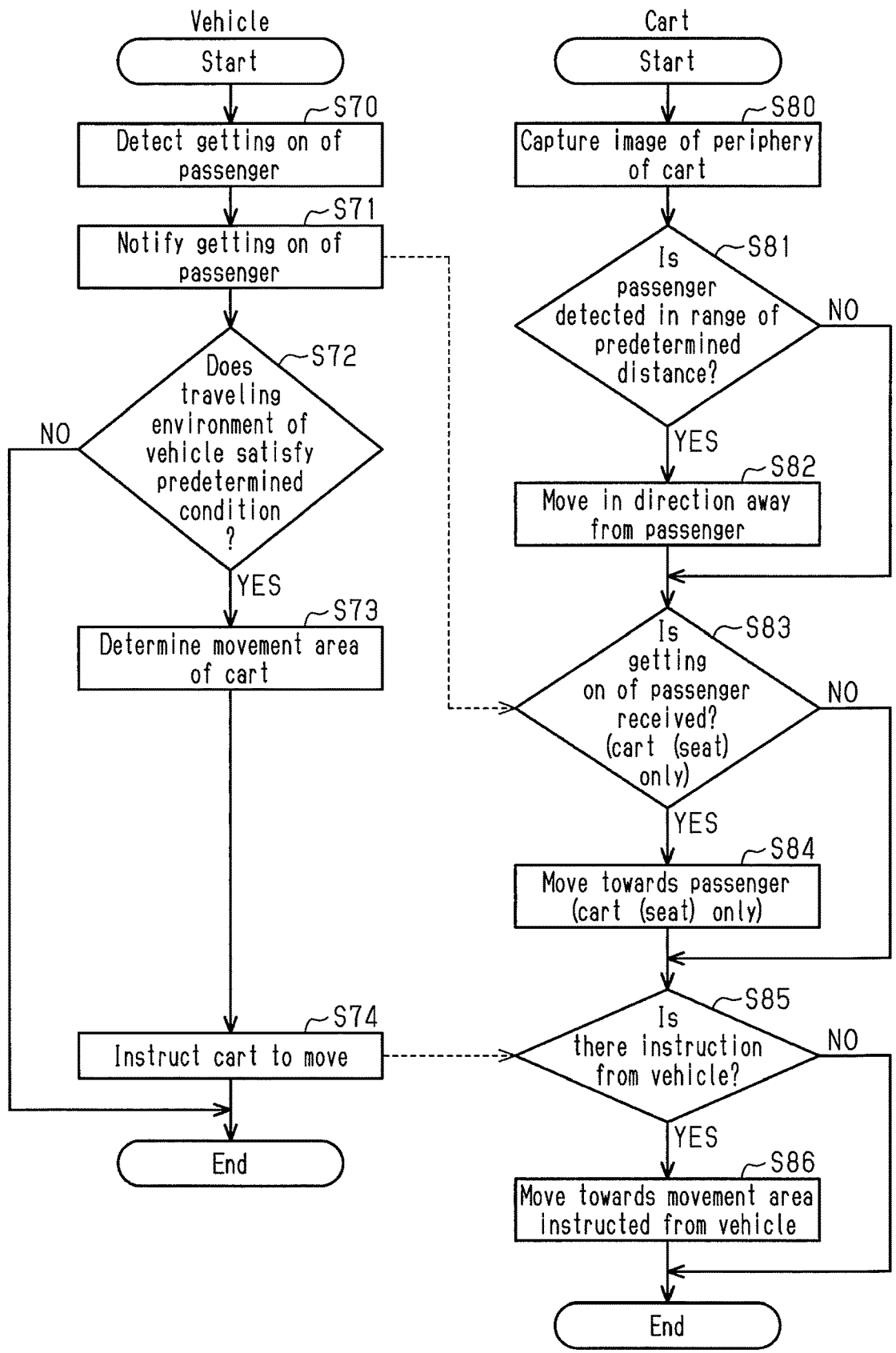
FIG. 16 is a flowchart illustrating a flow of processing when the arrangement of the carts in the cabin is controlled in vehicle according to a fourth embodiment.

As illustrated in FIG. 16, in this embodiment, the vehicle 300 first detects that a passenger gets on the vehicle 300 through the camera 340 (Step S70), and sends a corresponding detection signal to the cart 200 (Step S71).

Next, the vehicle 300 determines whether or not the traveling environment of the vehicle 300, acquired through the traveling environment sensor 330, satisfies a predetermined condition (Step S72).

Then, when it is determined that the traveling environment of the vehicle 300 does not satisfy the predetermined condition (Step S72: NO), the vehicle 300 ends the arrangement control of the cart 200 illustrated in FIG. 16.

In contrast, when it is determined that the traveling environment of the vehicle 300 satisfies the predetermined condition (Step S72: YES), the vehicle 300 determines the movement area of the cart 200 in the cabin (Step S73).

Then, the vehicle 300 instructs the cart 200 to move on the basis of the movement area determined in Step S73 described above (Step S74).

On the other hand, the cart 200 captures images of the periphery of the cart 200 through the camera 220 (Step S80).

Then, when a passenger 10 is detected in the range of a predetermined distance from the cart 200 itself through capturing images of the periphery of the cart 200 (Step S81: YES), the cart 200 is moved in a direction away from the passenger 10 to maintain a predetermined distance between the cart 200 itself and the passenger 10 (Step S82).

In contrast, when no passenger 10 is detected in the range of the predetermined distance (Step S81: NO), the cart 200 skips the processing of Step S82.

Subsequently, when a notification that a passenger 10 has gotten on the vehicle 300 is received from the vehicle 300 (Step S83: YES), the cart 200 of which the usage mode is "seat", is moved to approach the passenger 10 (Step S84).

After that, when the instruction of the movement is received from the vehicle 300 (Step S85: YES), the cart 200 is moved towards the movement area instructed from the vehicle 300 (Step S86), and then, ends the arrangement control of the cart 200 illustrated in FIG. 16.

In contrast, when there is no instruction from the vehicle 300 (Step 385: NO), the cart 200 ends the arrangement control of the cart 200 illustrated in FIG. 16 without performing the processing of Step S86.

As described above, the fourth embodiment has the following advantage in addition to the advantages (1) and (2) of the first embodiment.

(5) The size of the movement allowable range of the cart 200 in the cabin is determined by factoring in the presence or absence of the seating of a passenger 10 on the cart 200 of which the usage mode is "seat". Therefore, the boarding space of the passenger 10 can be further ensured.

Fifth Embodiment

Next, a vehicle according to a fifth embodiment will be described with reference to FIGS. 17 to 18. The fifth embodiment is different from the first embodiment in that the distance from a passenger that is maintained by the cart is changed according to the size for each type of cart. Therefore, in the following description, configurations different from those of the first embodiment will be mainly described, and the repeated description of the same configurations as those of the first embodiment or the corresponding configurations to those of the first embodiment will be omitted.

As illustrated in FIG. 17, in a data table T3 of this embodiment, examples of the type of cart 200 include a cart 200 that carries a small piece of baggage, a cart 200 of which a usage mode is "seat", and a cart 200 that carries a large piece of baggage in ascending order of the size of the cart 200. Then, the distance from the passenger 10 that is maintained by the cart 200 is set such that the distance increases as the size of the cart 200 increases.

Next, in this embodiment, a flow of processing when the arrangement of the cart 200 in the cabin is controlled will be described.

Figure 18:
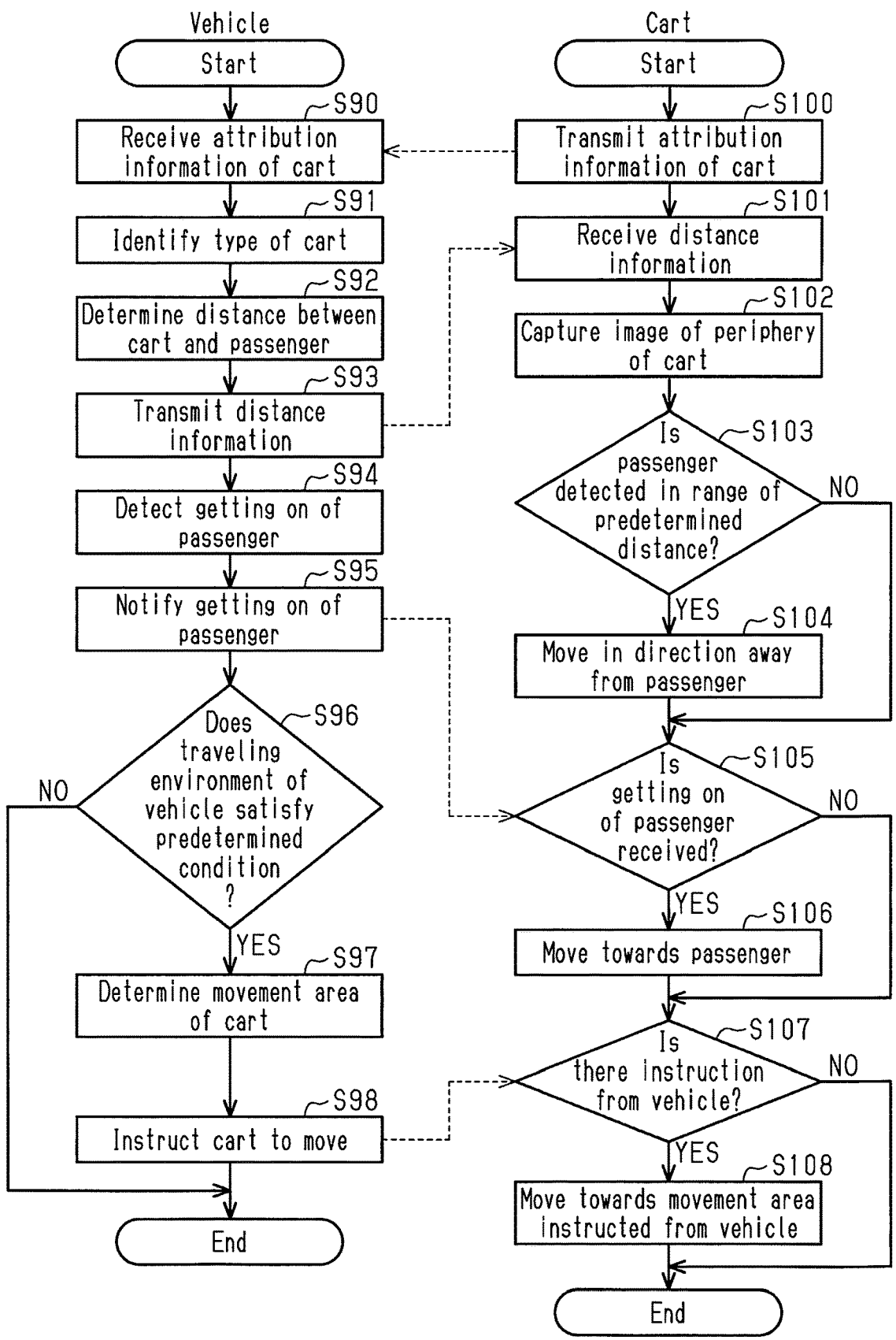
FIG. 18 is a flowchart illustrating a flow of processing when the vehicle of FIG. 17 controls the arrangement of the carts in the cabin.

As illustrated in FIG. 18, the cart 200 first transmits attribution information of the cart 200 to the vehicle 300 (Step S100).

When receiving the attribution information of the cart 200 from the cart 200 (Step S90), the vehicle 300 identifies the type of cart 200 on the basis of the received attribution information (Step S91).

Subsequently, the vehicle 300 determines the distance between the cart 200 and the passenger 10 with reference to the data table T3 on the basis of the type of cart 200 identified in Step S91 described above (Step S92) and transmits information of the determined distance to the cart 200 (Step S93).

Next, the vehicle 300 detects that the passenger 10 has gotten on the vehicle 300 through the camera 340 (Step S94) and notifies the cart 200 that the passenger 10 has gotten on the vehicle 300 (Step S95).

Subsequently, the vehicle 300 determines whether or not the traveling environment of the vehicle 300 acquired through the traveling environment sensor 330, satisfies a predetermined condition (Step S96).

Then, when it is determined that the traveling environment of the vehicle 300 does not satisfy the predetermined condition (Step S96: YES), the vehicle 300 ends the arrangement control of the cart 200 illustrated in FIG. 18.

In contrast, when it is determined that the traveling environment of the vehicle 300 satisfies the predetermined condition (Step S96: YES), the vehicle 300 determines the movement area of the cart 200 in the cabin (Step S97).

Then, the vehicle 300 instructs the cart 200 to move on the basis of the movement area determined in Step S97 described above (Step S98).

When receiving the information of the distance from the vehicle 300 (Step S101), the cart 200 captures images of the periphery of the cart 200 through the camera 220 (Step S102).

Then, when a passenger 10 is detected in the range of the predetermined distance received in Step S101 described above (Step S103: YES), the cart 200 is moved in a direction away from the passenger 10 to maintain the predetermined distance from the passenger 10 (Step S104).

In contrast, when no passenger 10 is detected in the range of the predetermined distance (Step S103: NO), the cart 200 skips the processing of Step S104.

Subsequently, when a notification that a passenger 10 has gotten on the vehicle 300 is received from the vehicle 300 (Step S105: YES), the cart 200 of which the usage mode is "seat" is moved to approach the passenger 10 (Step S106).

In contrast, when the notification that a passenger 10 has gotten on the vehicle 300 is not received from the vehicle 300 (Step S105: NO), the cart 200 of which the usage mode is "seat" skips the processing of Step S106.

After that, when the instruction of the movement is received from the vehicle 300 (Step S107: YES), the cart 200 is moved, towards the movement area instructed from the vehicle 300 (Step S108), and then, ends the arrangement control of the cart 200 illustrated in FIG. 18.

In contrast, when there is no instruction from the vehicle 300 (Step S107: NO), the cart 200 ends the arrangement control of the cart 200 illustrated in FIG. 18 without performing the processing of Step S108.

As described above, the fifth embodiment has the following advantage in addition to the advantages (1) and 12) of the first embodiment.

(6) The distance between the cart 200 and the passenger 10 is set such that the distance increases as the size of the cart 200 increases. This ensures the degree of freedom of the movement when the cart 200 performs the autonomous traveling while avoiding the passenger 10.

Sixth Embodiment

Next, a vehicle according to a sixth embodiment will be described with reference to FIGS. 19 to 22. The sixth embodiment is different from the first embodiment in that a fixed seat installed in the cabin is shaped (deformed) into a seat as necessary. Therefore, in the following description, configurations different from those of the first embodiment will be mainly described, and the repeated description of the same configurations as those of the first embodiment or the corresponding configurations to those of the first embodiment will be omitted.

Figure 19:
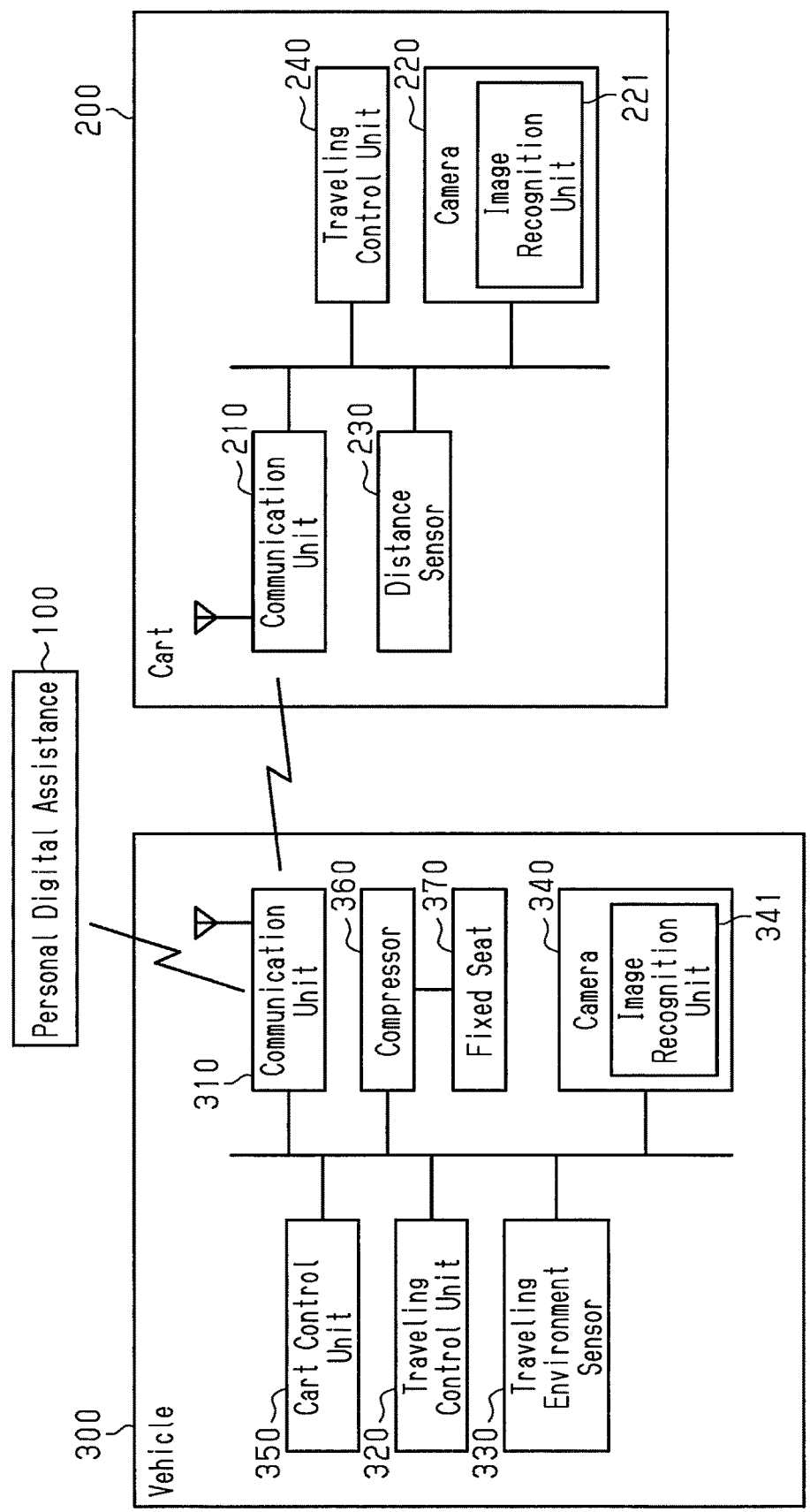
FIG. 19 is a block diagram illustrating a schematic configuration of a vehicle according to a sixth embodiment.

As illustrated in FIG. 19, the vehicle 300 further includes a compressor 360 and a fixed seat 370 in addition to the communication unit 310, the traveling control unit 320, the traveling environment sensor 330, the camera 340, and the cart control unit 350.

The compressor 360 is operated according to a manipulation by the passenger 10 and supplies compressed air to the fixed seat 370 having a flexible pouch, and thus, shapes the fixed seat 370 into a seat.

The cart control unit 360 detects whether or not the fixed seat 370 is shaped into of a seat on the basis of the presence or absence of reception of an operation signal from the compressor 360. Then, when the effect that the fixed seat 370 is shaped into a seat is detected, the cart control unit 350 excludes the installation area of the corresponding fixed seat 370 from the movement allowable range of the cart 200.

Figure 20A:
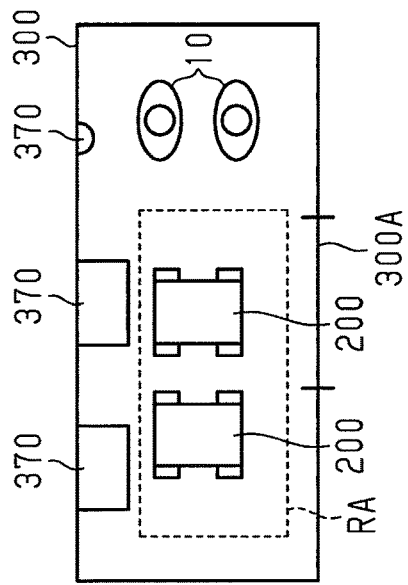
FIG. 20A is a schematic view illustrating an example of the movement allowable range of the carts in the cabin of the vehicle of FIG. 19.
Figure 20B:
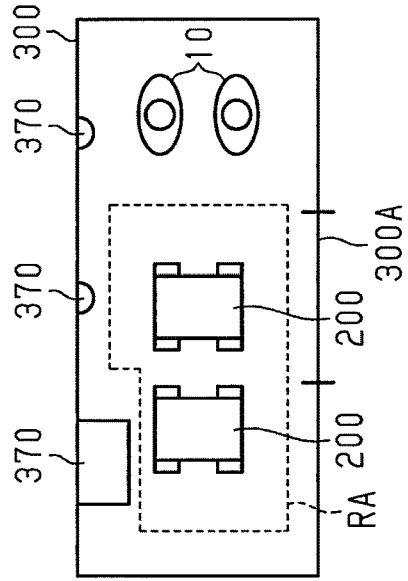
FIG. 20B is another schematic view illustrating an example of the movement allowable range of the carts in the cabin of the vehicle of FIG. 19.
Figure 20C:
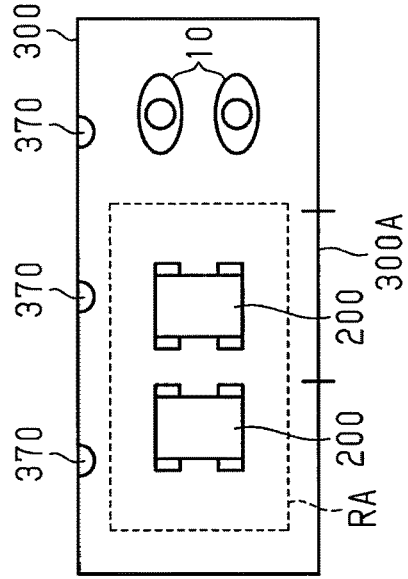
FIG. 20C is another schematic view illustrating an example of the movement allowable range of the carts in the cabin of the vehicle of FIG. 1-9.

For this reason, as illustrated by comparing FIGS. 20A to 20C with each other, even in a case where the number of carts 200 arranged in the cabin is the same (two units in the same drawing), and the number of passengers 10 arranged in the cabin is the same (two people in the same drawing), the size of the movement allowable range of the cart 200 decreases as the number of fixed seats 370 shaped into a seat by being supplied with the compressed air from the compressor 360 increases.

Next, in this embodiment, a flow of processing when the arrangement of the cart 200 in the cabin is controlled will be described.

Figure 21:
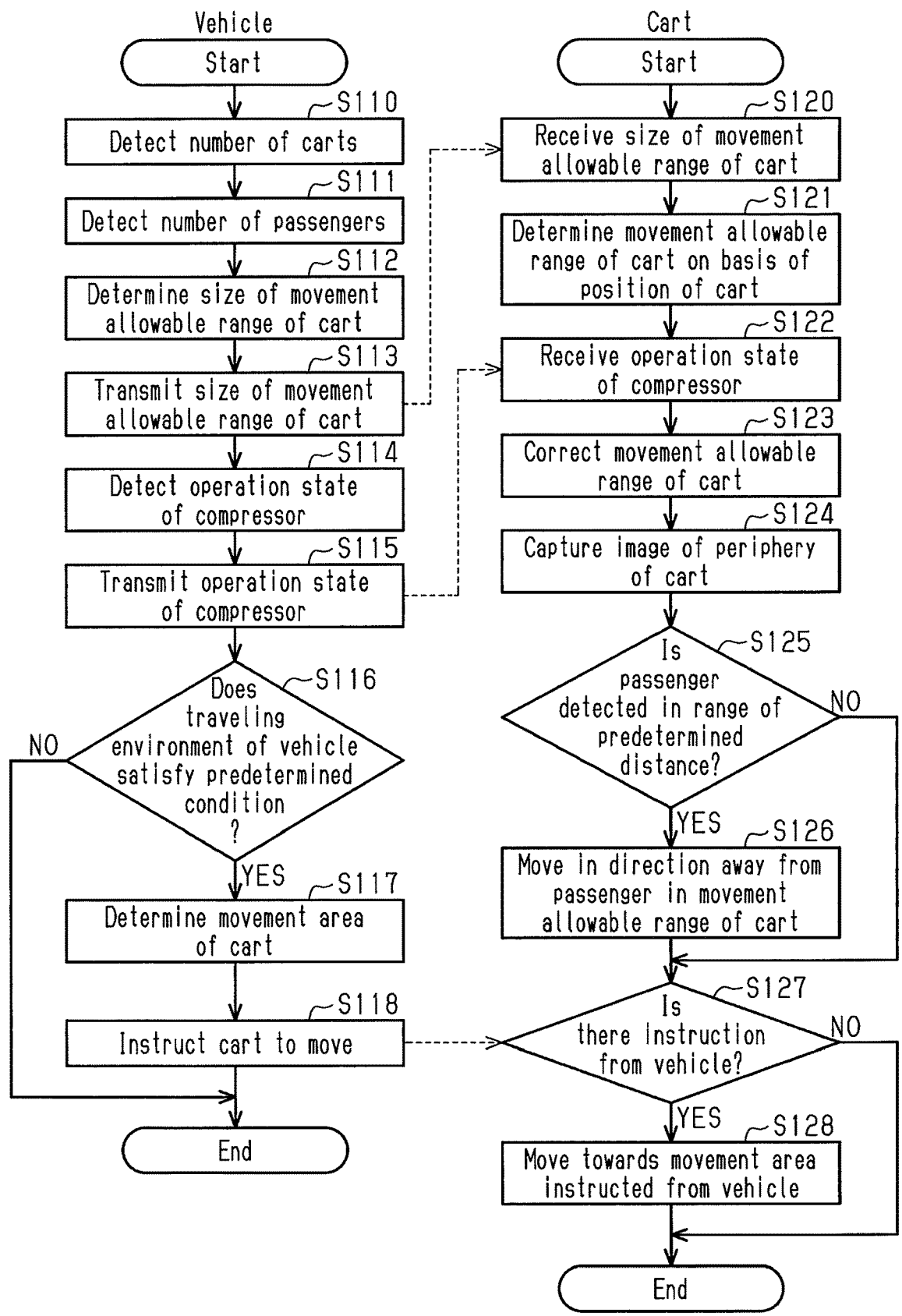
FIG. 21 is a flowchart illustrating a flow of processing when the vehicle of FIG. 19 controls the arrangement of the carts in the cabin.

As illustrated in FIG. 21, the vehicle 300 first detects the number of carts 200 arranged in the cabin on the basis of the signal acquired from each of the carts 200 by the communication unit 310 (Step S110).

Subsequently, the vehicle 300 detects the number of passengers 10 arranged in the cabin on the basis of the image captured through the camera 340 (Step S111).

Next, in the vehicle 300, the cart control unit 350 determines the size of the movement allowable range of the cart 200 with reference to the data table T1 on the basis of the number of carts 200 and the number of passengers 10 detected in Step S110 or Step S111 described above (Step S112).

In addition, the vehicle 300 transmits the size of the movement allowable range, determined in Step S112 described above, to the cart 200 (Step S113).

Subsequently, the vehicle 300 detects the operation state of the compressor 360 (Step S114) and transmits the detected operation state to the cart 200 (Step S115).

Next, the vehicle 300 determines whether or not the traveling environment of the vehicle 300, acquired through the traveling environment sensor 330, satisfies a predetermined condition (Step S116).

Then, when it is determined that the traveling environment of the vehicle 300 does not satisfy the predetermined condition (Step S116: NO), the vehicle 300 ends the arrangement control of the cart 200 illustrated in FIG. 21.

In contrast, when it is determined that the traveling environment of the vehicle 300 satisfies the predetermined condition (Step S116: YES), the vehicle 300 determines the movement area of the cart 200 in the cabin (Step S117).

Then, the vehicle 300 instructs the cart 200 to move on the basis of the movement area determined in Step S117 described above (Step S118).

When receiving the size of the movement allowable range of the cart 200 from the vehicle 300 (Step S120), the cart 200 determines the movement allowable range of the cart 200 with reference to the position of the cart 200 on the basis of the received size (Step S121).

Next, the cart 200 receives the operation state of the compressor 360 from the vehicle 300 (Step S122). Then, the cart 200 performs correction such that the installation area of the fixed seat 370, which is a supply target of the compressed air of the compressor 360, is excluded from the movement allowable range of the cart 200 determined in Step S121 described above (Step S123).

Subsequently, the cart 200 captures images of the periphery of the cart 200 through the camera 220 (Step S124).

Then, when a passenger 10 is detected in the range of a predetermined distance from the cart 200 itself, through capturing images of the periphery of the cart 200 (Step S125: YES), the cart 200 is moved in a direction away from the passenger 10 in the range of the movement allowable range determined in Step S121 described above to maintain a predetermined distance between the cart 200 itself and the passenger 10 (Step S126).

In contrast, when no passenger 10 is detected in the range of the predetermined distance (Step S125: NO), the cart 200 skips the processing of Step S126.

After that, when the instruction of the movement is received from the vehicle 300 (Step S127: YES), the cart 280 is moved towards the movement area instructed from the vehicle 300 (Step S128), and then, ends the arrangement control of the cart 200 illustrated in FIG. 21.

In contrast, when there is no instruction from the vehicle 300 (Step S127: NO), the cart 200 ends the arrangement control of the cart 200 illustrated in FIG. 21 without performing the processing of Step S128.

As described above, the sixth embodiment has the following advantage in addition to the advantages (1) and (2) of the first embodiment.

(7) The size of the movement allowable range of the cart 200 is corrected according to whether or not the fixed seat 370 installed in the cabin, is shaped into a seat. Therefore, the shaping of the fixed seat 370 into a seat, and the movement of the cart 200, can be compatible, as necessary.

Seventh Embodiment

Next, a vehicle according to a seventh embodiment will be described. The seventh embodiment is different from the first embodiment in that the cart is out of the control from the vehicle at the time of getting off the vehicle, and the cart starts the autonomous traveling. Therefore, in the following description, configurations different from those of the first embodiment will be mainly described, and the repeated description of the same configurations as those of the first embodiment or the corresponding configurations to those of the first embodiment will be omitted.

Next, in this embodiment, a flow of processing from when the arrangement of the cart 200 in the cabin is controlled will be described.

Figure 22:
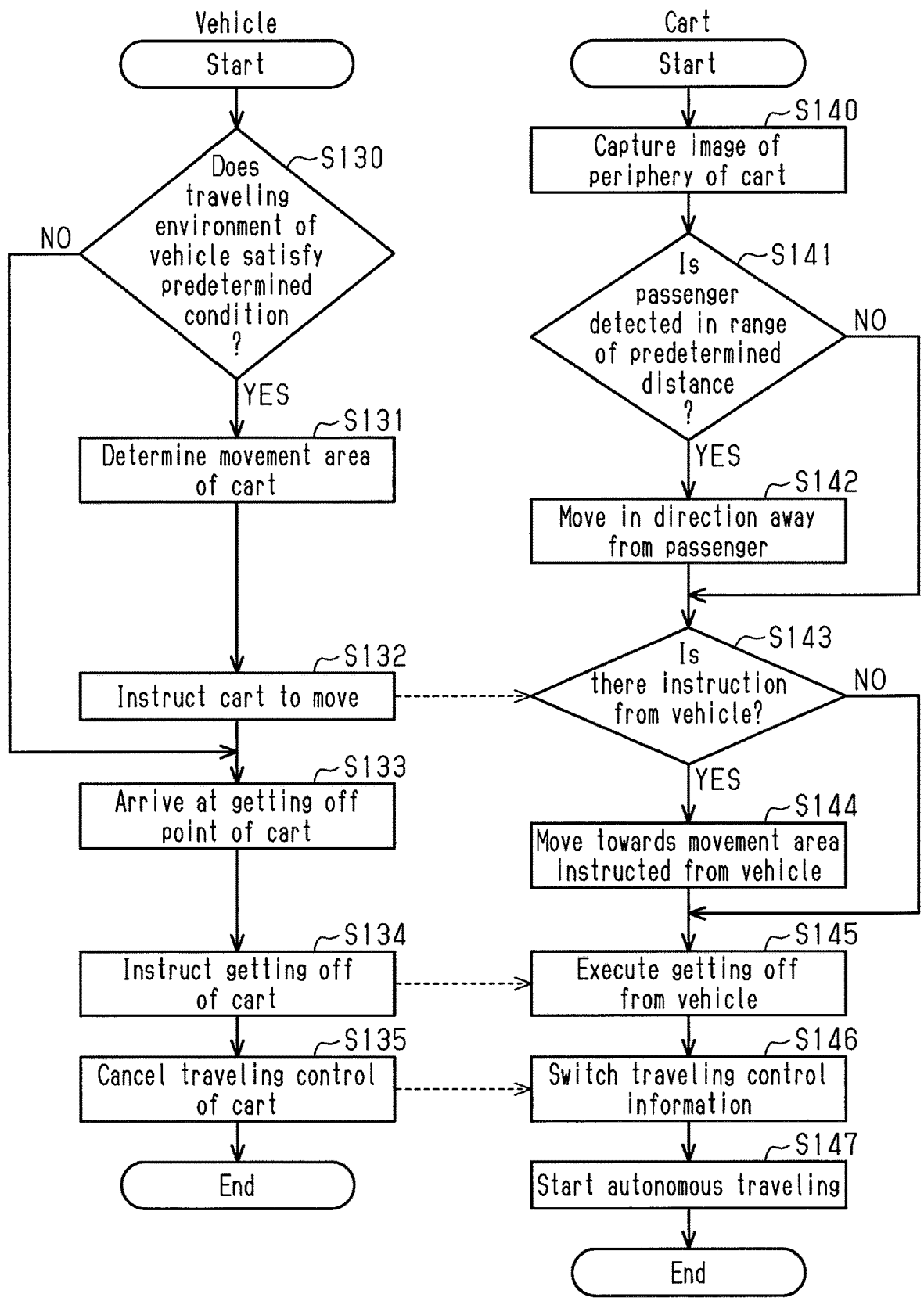
FIG. 22 is a flowchart illustrating a flow of processing when the vehicle of FIG. 19 controls the arrangement of the carts in the cabin.

As illustrated in FIG. 22, the vehicle 300 first determines whether or not the traveling environment of the vehicle 300, acquired through the traveling environment sensor 330, satisfies a predetermined condition (Step S130).

Then, when it is determined that the traveling environment of the vehicle 300 satisfies the predetermined condition (Step S130: YES), the vehicle 300 determines the movement area of the cart 200 in the cabin (Step S131).

In addition, the vehicle 300 instructs the cart 200 to move on the basis of the movement area determined in Step S131 described above (Step S132).

In contrast, when it is determined that the traveling environment of the vehicle 300 does not satisfy the predetermined condition (Step S130: NO), the vehicle 300 skips the processing of Step S131 and Step S132.

Subsequently, when arriving at a getting off point sit which the cart 200 is to get off the vehicle 300 (Step S133), the vehicle 300 instructs the cart 200 to get off the vehicle 300 (Step S134).

After that, the vehicle 300 cancels the traveling control of the cart 200 (Step S135), and then, ends the arrangement control of the cart 200 illustrated in FIG. 22.

In the description of the cart 200 first in the cabin of the vehicle 300, the cart 200 captures images of the periphery of the cart 200 through the camera 220 (Step S140).

Then, when a passenger 10 is detected in the range of a predetermined distance from the cart 200 itself, through capturing images of the periphery of the cart 200 (Step S141: YES), the cart 200 is moved in a direction away from the passenger 10 to maintain a predetermined distance between the cart 200 itself and the passenger 10 (Step S142).

In contrast, when no passenger is detected in the range of the predetermined distance (Step S141: NO), the cart 200 skips the processing of Step S142.

Subsequently, when the instruction of the movement is received in the cabin from the vehicle 300 (Step S143; YES), the cart 200 is moved towards the movement area instructed from the vehicle 300 (Step S144).

In contrast, when no instruction of the movement is received from the vehicle 300 (Step S143: NO), the cart 200 skips the processing of Step S144.

After that, when the cart 200 gets off the vehicle 300 (Step S145), the traveling control from the vehicle 300 is cancelled, and thus, the cart 200 switches traveling control information (Step S146). Then, the cart 200 starts the autonomous traveling outside the vehicle 300 (Step S147), and then, ends the traveling control of the cart 200 illustrated in FIG. 22.

As described above, the seventh embodiment has the following advantage in addition to the advantages (1) and (2) of the first embodiment.

(8) When the cart 200 gets off the vehicle 300, the traveling control from the vehicle 300 is cancelled, and the cart 200 starts the autonomous traveling outside the vehicle 300. Accordingly, for example, baggage can be delivered to the house of the user by using the vehicle 300 and the cart 200 together. In addition, the passenger 10 who has gotten off the vehicle 300 is capable of helping carry the baggage by using the cart 200. When the baggage is delivered to the house of the user, a service entrance for the cart 200 can be provided in a warehouse installed in the house, and thus, the baggage can be stored. In addition, a presence position of the cart 200 that has gotten off the vehicle 300 may be set in advance, for each area where the cart 200 is located in the cabin.

Other Embodiments

The above described embodiments may be modified as follows. The above-described embodiments and the following modifications can be combined as long as the combined modifications remain technically consistent with each other.

In each of the embodiments described above, when the camera 340 detects that the passenger has gotten on the vehicle 300, the cart control unit 350 of the vehicle 300 may control the arrangement of the carts 200 in the cabin. Instead of this, the cart control unit 350 may control the arrangement of the carts 200 in the cabin at a time point immediately before the passenger gets on the vehicle 300 on the basis of a reservation status from the passenger.

In the fourth embodiment or the fifth embodiment described above, when the passenger gets on the vehicle 300, the cart control unit 350 moves the cart 200 of which the usage mode is "seat" to approach the entrance 300A of the vehicle 300. Instead of this, when the passenger gets on the vehicle 300, the cart control unit 350 may switch the presence or absence of the movement of the cart 200 to the passenger according to attribution information of the passenger certified by the individual certification (an aged person, a disabled person, or the like) on the premise that the vehicle 300 performs individual certification of the passenger.

In each of the embodiments described above, a configuration is described in which the user manipulates the personal digital assistance 100, and thus, the vehicle 300 is dispatched to the position of the user. However, a method of dispatching the vehicle 300 is not limited thereto, and for example, the user may reserve boarding of the passenger or the cart 200 on the vehicle 300 on the premise that the vehicle 300 travels on a traveling route set in advance. In addition, in a case where a getting off position of the cart 200 that carries a commercial product is designated in advance by the user, the conveyance of the commercial product to the user can also be realized even when the user is located outside.

The controller that implements the above-described various control units can be constructed by a device that includes a CPU and a ROM and executes software processing, but is not limited to this configuration. For example, at least part of the processes executed by the software in the above-described embodiments may be executed by hardware circuits dedicated to execution of these processes (such as ASIC). That is, the controller may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

The invention claimed is:

1. A vehicle configured to accommodate a cart and a passenger, the vehicle comprising:
   a communication unit, which is configured to communicate with the cart;
   a traveling environment acquisition unit, which is configured to acquire a traveling environment of the vehicle; and
   a cart control unit, which is configured to control an arrangement of the cart within a movement allowable range in the vehicle through the communication unit according to the traveling environment acquired by the traveling environment acquisition unit, wherein the cart is configured to have an autonomous traveling function.

2. The vehicle according to claim 1, further comprising a passenger detection unit, which is configured to detect an arrangement of the passenger in the vehicle,
   wherein the cart control unit is configured to control the arrangement of the cart in the vehicle according to the arrangement of the passenger detected by the passenger detection unit.

3. The vehicle according to claim 2, wherein the cart control unit is configured to determine a size of the movement allowable range of the cart in the vehicle according to a number of carts acquired through the communication unit, and a number of passengers detected through the passenger detection unit.

4. The vehicle according to claim 2, wherein
   the cart is one of a plurality of carts including a first cart for carrying baggage and a second cart for boarding the passenger, and
   the cart control unit is configured to, when the passenger detection unit detects the passenger, move the first cart to maintain a distance between the passenger and the first cart and move the second cart to cause the second cart to approach the passenger.

5. The vehicle according to claim 4, wherein
   the second cart includes a seating detection unit detecting seating of the passenger on the second cart,
   the communication unit is configured to acquire information relevant to a presence or an absence of seating of the passenger on the second cart, and
   the cart control unit is configured to determine a size of the movement allowable range of the cart in the vehicle according to a total number of first carts and second carts acquired through the communication unit, a number of passengers detected through the passenger detection unit, and a number of passengers seated on the second cart.

6. A control method of a vehicle to be performed by a processor, the control method comprising:

acquiring a traveling environment of the vehicle in which a cart and a passenger are accommodated, by using a traveling environment acquisition unit of the vehicle; and communicating with the cart by using a communication unit of the vehicle to control an arrangement of the cart within a movement allowable range in the vehicle according to the acquired traveling environment, wherein the cart is configured to have an autonomous traveling function.

7. A non-transitory computer readable medium that stores a program for causing a processor to execute a control process of a vehicle, the control process including:

acquiring a traveling environment of the vehicle in which a cart and a passenger are accommodated by using a traveling environment acquisition unit of the vehicle; and communicating with the cart by using a communication unit of the vehicle to control an arrangement of the cart within a movement allowable range in the vehicle according to the acquired traveling environment, wherein the cart is configured to have an autonomous traveling function.

* * * * *

UNITED STATES PATENT AND TRADEMARK OFFICE
CERTIFICATE OF CORRECTION

PATENT NO.         : 11,009,891 B2
APPLICATION NO.    : 16/227240
DATED              : May 18, 2021
INVENTOR(S)        : Tomohito Matsuoka et al.

It is certified that error appears in the above-identified patent and that said Letters Patent is hereby corrected as shown below:

On the Title Page

Item (57), abstract, Line(s) 8, delete "toy" and insert --by--, therefor.

In the Specification

In Column 1, Line(s) 67, delete "or" and insert --of--, therefor.

In Column 2, Line(s) 37, after "cart", insert --in--.

In Column 4, Line(s) 30, delete "FIG. 1-9;" and insert --FIG. 19;--, therefor.

In Column 4, Line(s) 54, delete "(refer to FIG. 2)" and insert --(refer to Fig. 2C)--, therefor.

In Column 7, Line(s) 6, after "vehicle", delete ",".

In Column 7, Line(s) 53, delete "280" and insert --200--, therefor.

In Column 7, Line(s) 55, delete "(Step 22)" and insert --(Step S22)--, therefor.

In Column 10, Line(s) 39, delete "ease" and insert --case--, therefor.

In Column 11, Line(s) 42, after "movement", delete ",".

In Column 13, Line(s) 39, delete "(Step S96: YES)" and insert --(Step S96: NO)--, therefor.

In Column 14, Line(s) 3, after "moved", delete ",".

In Column 14, Line(s) 11, delete "12)" and insert --(2)--, therefor.

Signed and Sealed this
Twentieth Day of July, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,009,891 B2

In Column 14, Line(s) 40, delete "360" and insert --350--, therefor.

In Column 15, Line(s) 53, delete "280" and insert --200--, therefor.

In Column 16, Line(s) 32, delete "sit" and insert --at--, therefor.